US012219116B2

(12) United States Patent
Takahashi et al.

(10) Patent No.: US 12,219,116 B2
(45) Date of Patent: Feb. 4, 2025

(54) INFORMATION PROCESSING APPARATUS, INFORMATION PROCESSING METHOD, REPRODUCTION PROCESSING DEVICE, AND REPRODUCTION PROCESSING METHOD

(71) Applicant: Sony Group Corporation, Tokyo (JP)

(72) Inventors: Ryohei Takahashi, Tokyo (JP); Mitsuhiro Hirabayashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 562 days.

(21) Appl. No.: 17/615,586

(22) PCT Filed: Mar. 31, 2020

(86) PCT No.: PCT/JP2020/014888
§ 371 (c)(1),
(2) Date: Dec. 1, 2021

(87) PCT Pub. No.: WO2020/261690
PCT Pub. Date: Dec. 30, 2020

(65) Prior Publication Data
US 2022/0247991 A1   Aug. 4, 2022

Related U.S. Application Data

(60) Provisional application No. 62/868,497, filed on Jun. 28, 2019.

(51) Int. Cl.
*H04N 13/178* (2018.01)
*H04N 13/161* (2018.01)
*H04N 21/81* (2011.01)

(52) U.S. Cl.
CPC ......... *H04N 13/178* (2018.05); *H04N 13/161* (2018.05); *H04N 21/816* (2013.01)

(58) Field of Classification Search
CPC .. H04N 13/178; H04N 13/161; H04N 21/816; H04N 2013/0085; H04N 13/128; H04N 19/597; H04N 21/85406
See application file for complete search history.

(56) References Cited

U.S. PATENT DOCUMENTS

| 11,095,920 B2 * | 8/2021 | Fleureau ................ H04N 19/46 |
| 2017/0111650 A1 * | 4/2017 | Hendry ................. H04N 19/70 |

(Continued)

FOREIGN PATENT DOCUMENTS

| CN | 101933337 A | 12/2010 |
| CN | 104904204 A | 9/2015 |

(Continued)

OTHER PUBLICATIONS

International Search Report and Written Opinion mailed on Jun. 23, 2020, received for PCT Application PCT/JP2020/014888, Filed on Mar. 31, 2020, 10 pages including English Translation.

(Continued)

*Primary Examiner* — Boubacar Abdou Tchoussou
(74) *Attorney, Agent, or Firm* — XSENSUS LLP

(57) ABSTRACT

An atlas processing unit generates atlas identification information associating a texture image that forms a reference two-dimensional image corresponding to each projection direction formed by projecting three-dimensional data from a predetermined viewpoint position in a plurality of projection directions and a complementary image for generating, from the reference two-dimensional image, a moved two-dimensional image based on a viewpoint position moved within a limited range from the predetermined viewpoint position, with a depth image corresponding to the texture image, and each piece of post decoding information for rendering each reference two-dimensional image and each moved two-dimensional image, the post decoding information including first post decoding information indicating that (Continued)

the first post decoding information is information of a "3DoF+" region in which the complementary image in the texture image is stored. An encoding unit encodes the texture image and the depth image to generate a texture layer and a depth layer.

21 Claims, 24 Drawing Sheets

(56) References Cited

U.S. PATENT DOCUMENTS

| | | | |
|---|---|---|---|
| 2018/0075592 A1 | 3/2018 | White | |
| 2018/0268570 A1 | 9/2018 | Budagavi | |
| 2018/0316902 A1 | 11/2018 | Tanaka | |
| 2019/0068946 A1 | 2/2019 | Stockhammer et al. | |
| 2020/0228777 A1* | 7/2020 | Dore | H04N 13/178 |
| 2021/0006830 A1* | 1/2021 | Yun | H04N 19/176 |
| 2021/0176496 A1* | 6/2021 | Chupeau | G06T 7/529 |
| 2021/0195162 A1* | 6/2021 | Chupeau | H04N 21/816 |
| 2021/0274147 A1* | 9/2021 | Fleureau | H04N 21/234 |
| 2022/0159298 A1* | 5/2022 | Boyce | H04N 19/70 |
| 2022/0167015 A1* | 5/2022 | Fleureau | H04N 19/177 |

FOREIGN PATENT DOCUMENTS

| | | |
|---|---|---|
| CN | 105519131 A | 4/2016 |
| CN | 108476346 A | 8/2018 |
| EP | 3457688 A1 | 3/2019 |
| EP | 3474562 A1 | 4/2019 |
| EP | 3489900 A | 5/2019 |
| JP | 2012-510102 A | 4/2012 |
| WO | 2018/215502 A1 | 11/2018 |
| WO | WO-2019002662 A1 | 1/2019 |

OTHER PUBLICATIONS

"ISO/IEC 14496-12", Information technology—Coding of audio-visual objects—Part 12:ISO base media file format, Dec. 15, 2015, 248 pages.

* cited by examiner

FIG.3
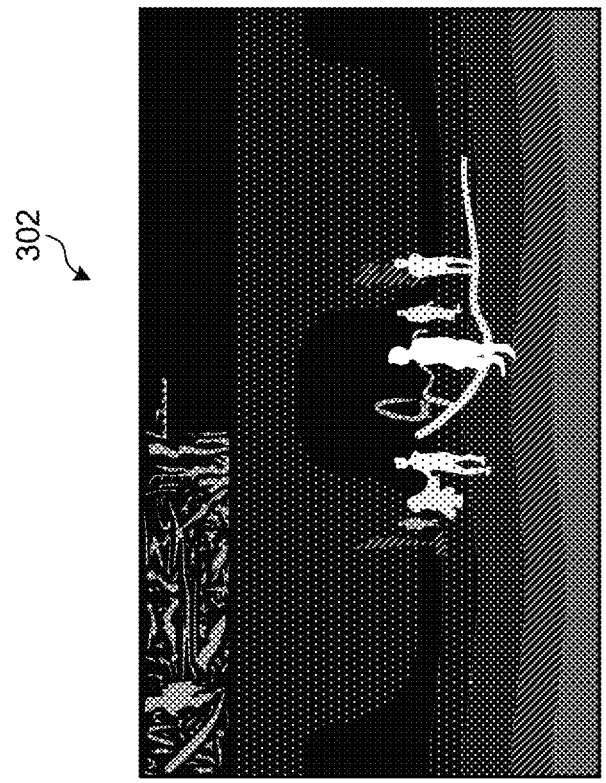
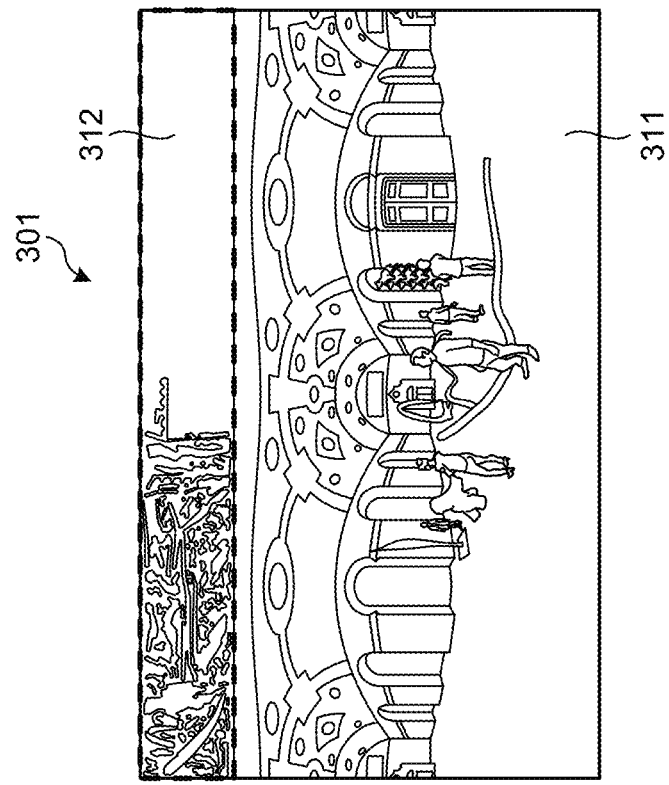

FIG.6

| scalability mask (bit) | | dimention_identifier |
|---|---|---|
| 0 | Texture or depth | DepthLayerFlag<br>0: texture layer, 1: depthlayer |
| 1 | Multiview | View Order Index |
| 2 | Spatial/quality scalability | DependencyId |
| 3 | Auxiliary | AuxId<br>1: Alpha plane, 2: Depth picture |
| 4 | Atlas | AtlasId |
| 5-15 | Reserced | |

FIG.9

```
class OperatingPointsRecord {
  unsigned int(16) scalability_mask;
  bit(2) reserved = 0;
  unsigned int(16) unm_profile_tier_level;
  for (i=1; i<=num_profile_tier_level; i++) {
    unsigned int(2) general_profile_space;
    unsigned int(1) general_tier_flag;
    unsigned int(5) general_profile_idc;
    unsigned int(32) general_profile_compatibility_flags;
    unsigned int(48) general_constraint_indicator_flags;
    unsigned int(8) general_level_idc;
  }
  unsigned int(16) num_operating_points;
  for (i=0; i<num_operating_points) {
    unsigned int(16) output_layer_set_idx;
    unsigned int(8) max_temporal_id;
    unsigned int(8) layer_count;
    for (j=0; j<layer_count; j++) {
      unsigned int(8) ptl_idx;
      unsigned int(6) layer_id;
      unsigned int(1) is_outputlayer;
      unsigned int(1) is_alternate_outputlayer;
    }
    unsigned int(16) minPicWidth;
    unsigned int(16) minPicHeight;
    unsigned int(16) maxPicWidth;
    unsigned int(16) maxPicHeight;
    unsigned int(2) maxChromaFormat;
    unsigned int(3) maxBitDepthMinus8;
    bit(1) reserved = 0;
    unsigned int(1) frame_rate_info_flag
    unsigned int(1) bit_rate_info_flag
    if (frame_rate_info_flag) {
      unsigned int(16) avgFrameRate;
      bit(6) reserved = 0;
      unsigned int(2) constantFrameRate;
    }
    if (bit_rate_info_flag) {
      unsigned int(32) maxBitRate;
      unsigned int(32) avgBitRate;
    }
  }
  unsigned int(8) max_layer_count;
  for (i=0; i<max_layer_count; i++) {
    unsigned int(8) layerID;
    unsigned int(8) num_direct_ref_layers;
    for (j=0; j<num_direct_ref_layers; j++) {
      unsigned int(8) direct_ref_layerID;
    }
    for (j=0; j<16; j++) {
      if (scalability_mask & (1 << j))
        unsigned int(8) dimension_identifier;
    }
  }
} class OperatingPointsInformation
  extends VisualSampleGroupEntry ('oinf') {
    OperatingPointsRecord oinf;
}
```

321: (profile tier level block)
322: (operating points block)
323: (max layer count block)

FIG.10

```
class LayerInfoGroupEntry
  extends VisualSampleGroupEntry ( 'linf' )) {
    bit(2) reserved = 0;
    unsigned int (6) num_layers_in_track;
    for (i=0; i<num_layers_in_track; i++) {
      bit(4) reserved = 0;
      unsigned int(6) layer_id;
      unsigned int(3) min_TemporalId;
      unsigned int(3) max_TemporalId;
      bit(1) reserved = 0;
      unsigned int(7) sub_layer_presence_flags;
    }
}
```

FIG.12

```
aligned(8) class ProjectedOmniVideoForParallaxBox() extends Box ( 'povp' ) {
  ProjectionInfoBox():
  // optional boxes
}
```

FIG.13

```
aligned(8) class ProjectionInfoBox() extends FullBox( 'pinf' , 0, 0){
  unsigned int(16) num_cameras; //NUMBER OF VIEWPOINT POSITIONS
  for(int i=0; i<num_cameras; i++){
    unsigned int(8) view_id; //IDENTIFIER OF THIS VIEWPOINT (camera)
    CameraPosStruct();
    DepthQuantizationStruct();
    ProjectionFormatStruct();
    RotationStruct();
    unsigned int(8) num_atlases; //NUMBER OF atlases INCLUDING patches OF THIS VIEWPOINT (camera)
    for (int j=0; j<num_atlases; j++)
      unsinged int(8) atlas_id; //IDENTIFIER OF atlas INCLUDING patch CORRESPONDING TO VIEWPOINT
      RegionWisePackingStruct();
  }
}
```

FIG.14

351
```
aligned(8) class CameraPosStruct() {
    unsigned int(32) camera_pos_x;
    unsigned int(32) camera_pos_y;
    unsigned int(32) camera_pos_z;
}
```

352
```
aligned(8) class DepthQuantizationStruct() {
    unsigned int(8) quantization_law;
    if (quantization_law == 0) {
        unsigned int(32) depth_near;
        unsigned int(32) depth_far;
    }
}
```

353
```
aligned(8) class ProjectionFormatStruct() {
    bit(3) reserved = 0;
    unsigned int(5) projection_type;
}
```

354
```
aligned(8) class RotationStruct() {
    signed int(32) rotation_yaw;
    signed int(32) rotation_pitch;
    signed int(32) rotation_roll;
}
```

355
```
aligned(8) class RegionWisePackingStruct() {
    unsigned int(1) constituent_picture_matching_flag;
    bit(7) reserved = 0;
    unsigned int(8) num_regions;
    unsigned int(32) proj_picture_width;
    unsigned int(32) proj_picture_height;
    unsigned int(16) packed_picture_width;
    unsigned int(16) packed_picture_height;
    for (i = 0; i < num_regions; i++) {
        bit(3) reserved = 0;
        unsigned int(1) guard_band_flag[i];
        unsigned int(4) packing_type[i];
        if (packing_type[i] == 0) {
            RectRegionPacking(i);
            if (guard_band_flag[i])
                GuardBand(i);
        }
    }
}
```

356
```
aligned(8) class RectRegionPacking(i) {
    unsigned int(32) proj_reg_width[i];
    unsigned int(32) proj_reg_height[i];
    unsigned int(32) proj_reg_top[i];
    unsigned int(32) proj_reg_left[i];
    unsigned int(3) transform_type[i];
    bit(5) reserved = 0;
    unsigned int(16) packed_reg_width[i];
    unsigned int(16) packed_reg_height[i];
    unsigned int(16) packed_reg_top[i];
    unsigned int(16) packed_reg_left[i];
}
```

357

| projection_type | Projection format |
|---|---|
| 0 | Equirectangular projection |
| 1 | Cubemap projection |
| 2 | Perspective projection |
| 3..31 | Reserved |

```
aligned(8) class ProjectionInfoBox() extends FullBox('povp', 0, 0){
  unsigned int(16) num_cameras;
  for(int i=0; i<num_cameras; i++){
    CameraPosStruct();
    ProjectionFormatStruct();
    RotationStruct();
    RegionWisePackingStructV2();
  }
}
```

362

```
aligned(8) class RegionWisePackingStructV2() {
  unsigned int(1) constituent_picture_matching_flag;
  bit(7) reserved = 0;
  unsigned int(8) num_regions;
  unsigned int(32) proj_picture_width;
  unsigned int(32) proj_picture_height;
  unsigned int(16) packed_picture_width;
  unsigned int(16) packed_picture_height;
  for (i = 0; i < num_regions; i++) {
    bit(3) reserved = 0;
    unsigned int(1) guard_band_flag[i];
    unsigned int(4) packing_type[i];
    unsigned int(8) atlas_id;
    if (packing_type[i] == 0) {
      RectRegionPacking(i);
      if (guard_band_flag[i])
        GuardBand(i);
    }
  }
}
```

FIG.16

```
aligned(8) class ProjectionInfoBox() extends FullBox( 'pinf' , 0, 0){
  unsigned int(16) num_cameras;
  for(int i=0; i<num_cameras; i++){
    CameraPosStruct();
    ProjectionFormatStruct();
    RotationStruct();
    unsigned int(1) is_3DoF_compatible;
    unsigned int(7) reserved=0;
    unsigned int(8) num_atlases;
    for (int j=0; j<num_atlases; j++)
      unsinged int(8) atlas_id;
      RegionWisePackingStruct();
  }
}
```

FIG.24

```
aligned(8) class SpatialRelationship2DDescriptionBox extends TrackGroupTypeBox('2dcc') {
        // track_group_id is inherited from TrackGroupTypeBox;
        SpatialRelationship2DSourceBox();          // mandatory, must be first
        SubPictureRegionBox ();                     // optional
        ThreeDoFCompatibleBox(); // optional
}
```

INFORMATION PROCESSING APPARATUS, INFORMATION PROCESSING METHOD, REPRODUCTION PROCESSING DEVICE, AND REPRODUCTION PROCESSING METHOD

CROSS-REFERENCE TO RELATED APPLICATIONS

The present application is based on PCT filing PCT/JP2020/014888, filed Mar. 31, 2020, which claims priority to U.S. Provisional Application No. 62/868,497, filed Jun. 28, 2019, the entire contents of each are incorporated herein by reference.

FIELD

The present invention relates to an information processing apparatus, an information processing method, a reproduction processing device, and a reproduction processing method.

BACKGROUND

Moving picture experts group-dynamic adaptive streaming over HTTP (MPEG-DASH) exists as a standard of adaptive content delivery technology based on the hypertext transfer protocol (HTTP). Further, international organization for standardization base media file format (ISOBMFF) is known as a file container specification of "MPEG-4" which is an international standard technique for moving image compression in a file format of MPEG-DASH.

By the way, there is a video that reproduces an omnidirectional image obtained by mapping a three-dimensional structure image, which is an image obtained by projecting an image of 360 degrees around in a horizontal direction and an image of 180 degrees around in a vertical direction onto a three-dimensional structure, to a plane image, like an omnidirectional video. The omnidirectional video is also called a 3DoF video, and the omnidirectional image is also called a projected plane image or a 3 degrees of freedom (3DoF) image. In MPEG-I omnidirectional media format (OMAF), the use of the MPEG-DASH for the delivery of the three-dimensional structure image forming the omnidirectional image has been considered.

Furthermore, in recent years, the delivery of a "3 degrees of freedom plus (3DoF+)" video that can provide a video viewing experience involving viewpoint parallel movement within a limited range has also been considered in addition to the surrounding viewing around three axes that can be executed in the 3DoF video. In MPEG-I Phase 1b requirement, provision of backward compatibility to a player (OMAF ed. 1 player) conforming to the first edition of the OMAF standard is listed as a requirement related to "3DoF+", and technology development that satisfies this requirement is in progress.

Data providing a video viewing experience of "3DoF+" is referred to as a "3DoF+" stream. The "3DoF+" stream includes a texture layer, a depth layer, and "3DoF+" metadata as components. The texture layer is a set of patches of texture for rendering the "3DoF+" video. In addition, the depth layer is a set of patches of depth for rendering the "3DoF+" video. In addition, the "3DoF+" metadata includes information on a viewpoint position where each patch is visible, and the like. A client device selects a patch to be used for rendering a viewing video from the texture layer and the depth layer on the basis of the "3DoF+" metadata and performs rendering, thereby reproducing the "3DoF+" video.

Furthermore, the texture layer in the "3DoF+" stream includes a 3DoF viewable region that is called a 3DoF region, and a "3DoF+" region that is added to the 3DoF region to enable "3DoF+" viewing. By including such a texture layer, it is possible to generate the 3DoF image by rendering the 3DoF region of the texture layer of the "3DoF+" stream. In other words, a use method of generating the 3DoF video based on the "3DoF+" stream is conceivable even in the client device that does not have a reproduction capability for the "3DoF+" video, but has a 3DoF rendering function.

CITATION LIST

Non Patent Literature

Non-Patent Literature 1: "ISO/IEC 14496-12: 2015", Information technology, Coding of audio-visual objects, Part 12: ISO base media file format, 2015 December

SUMMARY

Technical Problem

However, in a case where the 3DoF region in the "3DoF+" stream is rendered, the client device performs processing of rendering the entire "3DoF+" and then performs processing of outputting the 3DoF video viewed from a specific viewpoint position. Therefore, in practice, it is difficult for the client device that does not have the reproduction capability for the "3DoF+" video, but has the 3DoF rendering function to reproduce the 3DoF video by using the "3DoF+" stream. Therefore, the viewing experience of the user is limited.

Therefore, the present disclosure provides an information processing apparatus, an information processing method, a reproduction processing device, and a reproduction processing method capable of expanding the viewing experience of the user.

Solution to Problem

According to the present disclosure, an atlas processing unit generates atlas identification information associating a texture image that forms a reference two-dimensional image corresponding to each projection direction formed by projecting three-dimensional data from a predetermined viewpoint position in a plurality of projection directions and a complementary image for generating, from the reference two-dimensional image, a moved two-dimensional image based on a viewpoint position moved within a limited range from the predetermined viewpoint position, with a depth image corresponding to the texture image, and each piece of post decoding information for rendering each reference two-dimensional image and each moved two-dimensional image, the post decoding information including first post decoding information indicating that the first post decoding information is information of a "3DoF+" region in which the complementary image in the texture image is stored. An encoding unit encodes the texture image and the depth image to generate a texture layer and a depth layer. A file generating unit generates a file including the texture layer, the depth layer, the atlas identification information, and the post decoding information.

BRIEF DESCRIPTION OF DRAWINGS

FIG. 3 is a view illustrating a texture image and a depth image.

FIG. 6 is a diagram illustrating an extension example of scalability_mask and dimension_identifier.

FIG. 9 is a diagram illustrating an example of an oinf sample group.

FIG. 10 is a diagram illustrating an example of a linf sample group.

FIG. 12 is a diagram illustrating an example of a syntax of ProjectedOmniVideoForParallaxBox.

FIG. 13 is a diagram illustrating an example of a syntax of ProjectionInfoBox.

FIG. 14 is a diagram illustrating an example of syntaxes of CameraPosStruct, DepthQuantizationStruct, ProjectionFormatStruct, RotationStruct, and RefionWisePackingStruct in ProjectionInfoBox.

FIG. 15 is a diagram illustrating another example of the syntax of ProjectionInfoBox and RegionWisePackingStruct.

FIG. 16 is a diagram illustrating an example of a syntax of ProjectionInfoBox extended so as to indicate a viewpoint position where 3DoF rendering is possible.

FIG. 24 is a diagram illustrating an example of a syntax of sub-picture track grouping according to a modified example (1) of the third embodiment.

DESCRIPTION OF EMBODIMENTS

Figure 1:
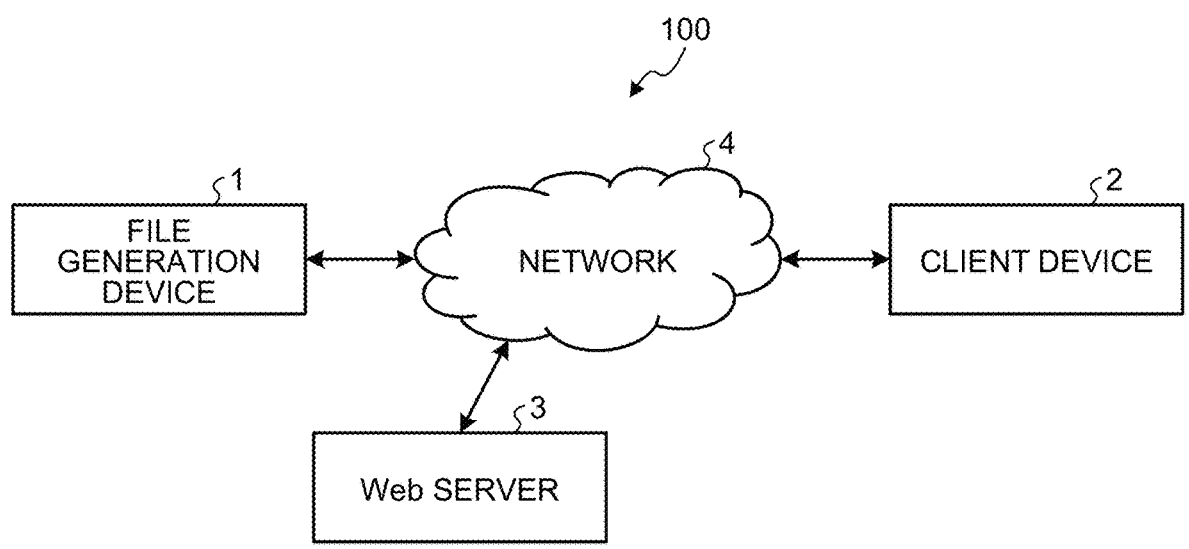
FIG. 1 is a system configuration diagram of an example of a delivery system.

Hereinafter, embodiments of the present disclosure will be described in detail with reference to the drawings. Note that in each of the following embodiments, the same reference signs denote the same portions, and an overlapping description will be omitted. Furthermore, the scope disclosed in the present technology is not limited to the contents of the embodiments, and includes the contents described in the following non-patent literatures known at the time of filing.

Non-Patent Literature 1: (described above)

Non-Patent Literature 2: "ISO/IEC 14496-15: 2017", Information technology, Coding of audio-visual objects, Part 15: Carriage of network abstraction layer (NAL) unit structure video in the ISO base media file format 2017 February Non-Patent Literature 3: "ISO/IEC 23090-2: 2019", Information technology, Coded representation of immersive media, Part 2: Omnidirectional media format, 2019 January Non-Patent Literature 4: N17331, Requirements MPEG-I phase 1b, version 1, 2018 Feb. 22

Non-Patent Literature 5: M48024, Strawman Design for "3DoF+", version 2, 2019-03-28

Non-Patent Literature 6: M47544, Extensions to Technicolor-Intel Response to "3DoF+" CfP, version 2, 2019-03-22

Non-Patent Literature 7: N18464, Working Draft 1 of Metadata for Immersive Media (Video), version 1, 2019 Apr. 26

Non-Patent Literature 8: "Matroska Media Container", [Searched on Feb. 27, 2020], Internet <URL: https://www.matroska.org/>

That is, the contents described in the above-described non-patent literatures are also incorporated herein by reference. That is, the content described in the above-described non-patent literature also serves as a basis for determining support requirements. For example, even in a case where the terms used in file structures described in Non-Patent Literatures 1 to 3 and 8 and a "3DoF+" stream structure described in Non-Patent Literatures 5 to 7 are not directly described in the detailed description of the invention, they fall within the disclosure scope of the present technology and satisfy the support requirements of the claims. Furthermore, for example, even in a case where technical terms such as parsing, syntax, and semantics are also not directly defined in the detailed description of the invention, the technical terms fall within the disclosure scope of the present technology and satisfy the support requirements of the claims.

Further, the present disclosure will be described in the following order.

1. First Embodiment
1.1 Modified Example of First Embodiment
2. Second Embodiment
2.1 Modification of Second Embodiment
3. Third Embodiment
3.1 Modified Example (1) of Third Embodiment
3.2 Modified Example (2) of Third Embodiment
4. Fourth Embodiment

1. First Embodiment

A "3DoF+" stream includes a texture layer, a depth layer, and "3DoF+" metadata. The "3DoF+" metadata specifically includes a camera parameter and atlas parameter list metadata. The camera parameter is information on a viewpoint position where each patch is visible. In addition, the atlas parameter list metadata represents information on mapping between a display position for each patch and a position on a codec picture. A layer pair that is a set of a corresponding texture layer and depth layer is called an atlas.

Then, the texture layer of the "3DoF+" stream includes a 3DoF region and a "3DoF+" region. In the "3DoF+" region, fine patches are stored, and each patch includes information used for a video from another angle of an image formed by rendering the 3DoF region.

The "3DoF+" stream is encoded using multi-layer high efficiency video codec (HEVC). Multi-layer HEVC is an encoding method in which one stream includes a plurality of layers such as a low-resolution layer and a high-resolution layer. The "3DoF+" metadata is stored in a bitstream as, for example, supplemental enhancement information (SEI). The bitstream is data of a "3DoF+" image forming the "3DoF+" stream. Further, a video parameter set (VPS), which is a kind of metadata of HEVC, is extended, and an atlas flag is assigned to each layer, whereby a layer pair constituting the atlas can be identified.

Here, a case where a reproduction processing device has a 3DoF rendering function but does not have a reproduction capability for a "3DoF+" video is considered. Hereinafter, the reproduction processing device that has the 3DoF rendering function but does not have the reproduction capability for the "3DoF+" video is referred to as a 3DoF reproduction processing device. There are several types of 3DoF reproduction processing devices. For example, there is a 3DoF reproduction processing device that can decode the "3DoF+" stream and perform 3DoF rendering due to a rendering capability or a functional restriction, but does not support rendering of the "3DoF+" video. In addition, for example, there is a 3DoF reproduction processing device that does not have any of a function of decoding the "3DoF+" stream such as OMAF ed. 1 player and a rendering function.

Since the texture layer of the "3DoF+" stream includes the 3DoF region and the "3DoF+" region, it is conceivable that the 3DoF reproduction processing device performs rendering only on the 3DoF region of the texture layer of the "3DoF+" stream. In a case where such processing can be performed, the same "3DoF+" stream can be appropriately reproduced in accordance with the reproduction capability even in the reproduction processing devices having different reproduction capabilities, and it is not necessary to prepare a stream for each reproduction capability of the reproduction processing device. As a result, for example, content delivery network (CDN) storage included in a delivery server at the time of delivery can be saved, and contents that can be reproduced by the reproduction processing device can be increased. Note that a technical requirement regarding "3DoF+" of MPEG-I Phase 1b also requires a measure for this case.

However, in a case where the 3DoF region included in the "3DoF+" stream is rendered, a 3DoF-compatible client device 2 performs rendering "3DoF+" once, and then performs processing of outputting only the 3DoF video viewed from a specific viewpoint position. This means that it is difficult for the 3DoF-compatible client device 2 to process the "3DoF+" stream. That is, in a conventional delivery system for a "3DoF+" content, it is difficult to obtain the above-described advantages. Therefore, a delivery system in which the 3DoF reproduction processing device can reproduce the delivered "3DoF+" content will be described below.

Configuration of System According to First Embodiment

FIG. 1 is a system configuration diagram of an example of the delivery system. A delivery system 100 includes a file generation device 1 that is an information processing apparatus, a client device 2 that is a reproduction processing device, and a web server 3. The file generation device 1, the client device 2, and the web server 3 are connected to a network 4. The file generation device 1, the client device 2, and the web server 3 can perform communication with each other via the network 4. Here, although FIG. 1 illustrates a case where the number of each device is one, the delivery system 100 may include a plurality of file generation devices 1 and a plurality of client devices 2.

The file generation device 1 generates the "3DoF+" stream which is data for providing the "3DoF+" video. The file generation device 1 uploads the generated "3DoF+" stream to the web server 3. Here, a configuration in which the web server 3 provides the "3DoF+" stream to the client device 2 will be described in the present embodiment, but the delivery system 100 can have another configuration. For example, the file generation device 1 may have the function of the web server 3, store the generated "3DoF+" stream therein, and provide the "3DoF+" stream to the client device 2.

The web server 3 holds the "3DoF+" stream uploaded from the file generation device 1. Then, the web server 3 provides a "3DoF+" stream specified by a request from the client device 2.

The client device 2 transmits a transmission request for the "3DoF+" stream to the web server 3. Then, the client device 2 acquires the "3DoF+" stream specified by the transmission request from the web server 3. Then, the client device 2 decodes the "3DoF+" stream to generate a video, and causes a display device such as a monitor to display the video.

Configuration of File Generation Device According to First Embodiment

Figure 2:
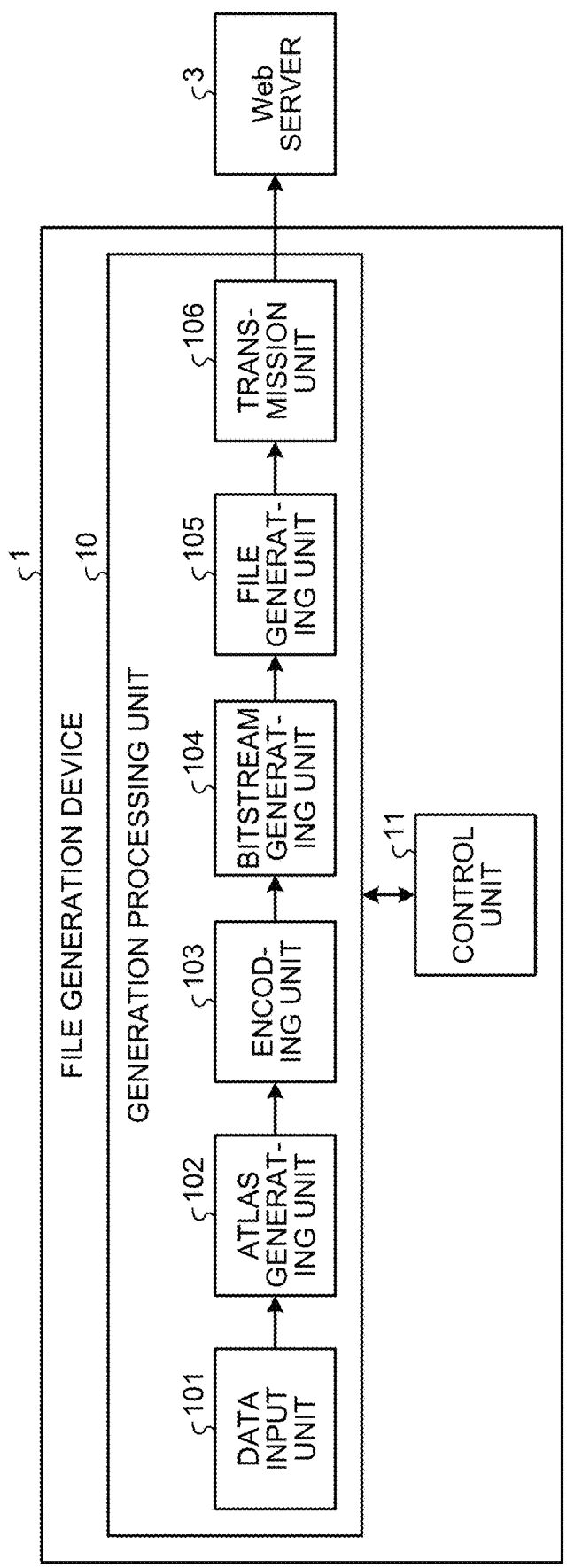
FIG. 2 is a block diagram of a file generation device.

Next, details of the file generation device 1 will be described. FIG. 2 is a block diagram of the file generation device. As illustrated in FIG. 2, the file generation device 1 which is the information processing apparatus includes a generation processing unit 10 and a control unit 11. The control unit 11 performs processing related to a control of the generation processing unit 10. For example, the control unit 11 performs a centralized control such as an operation timing of each unit of the generation processing unit 10. The generation processing unit 10 includes a data input unit 101, an atlas processing unit 102, an encoding unit 103, a bitstream generating unit 104, a file generating unit 105, and a transmission unit 106.

The data input unit 101 receives image data of the "3DoF+" video, the "3DoF+" metadata, and the like. The "3DoF+" metadata includes information regarding a viewpoint such as time, position information, and viewpoint position information of an image. The data input unit 101 outputs the acquired image data to the atlas processing unit 102. In addition, the data input unit 101 outputs meta information to the encoding unit 103.

The atlas processing unit 102 receives the image data of the "3DoF+" video from the data input unit 101. Then, the atlas processing unit 102 generates data of a texture image and data of a depth image data from the image data. The texture image is an image corresponding to each projection direction, formed by projecting three-dimensional data from a determined viewpoint position in a plurality of projection directions. The depth image is an image representing the position of each point on the texture image in a three-dimensional space.

FIG. 3 is a view illustrating the texture image and the depth image. An image 301 in FIG. 3 is the texture image.

A region 311 is the 3DoF region, and a region 312 is the "3DoF+" region. The "3DoF+" region includes a patch that is a correction image for generating an image viewed from an angle slightly shifted from the viewpoint position in the 3DoF region. Further, an image 302 is the depth image. Then, the atlas processing unit 102 generates an atlas by combining the data of the corresponding texture image and the data of the corresponding depth image. Further, the atlas processing unit 102 generates an atlas arrangement parameter for displaying the atlas as an omnidirectional video.

Further, an atlas ID, which is a pair identifier of a texture image and a depth image constituting an atlas, is generated and assigned to each atlas. In addition, the atlas processing unit 102 generates post decoding information which is metadata for generating an omnidirectional video from two-dimensional data.

Figure 4:
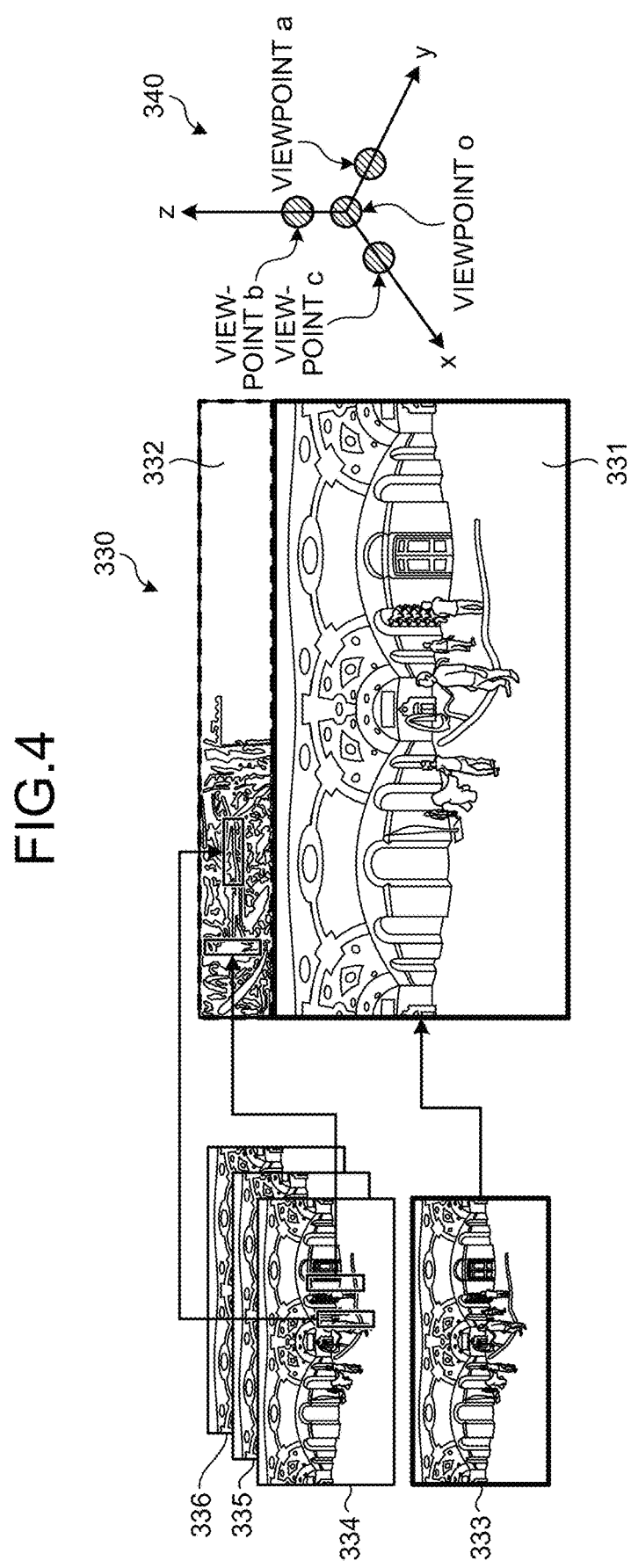
FIG. 4 is a diagram for describing details of the texture image.

Here, in order to describe the post decoding information, details of the texture image will be described with reference to FIG. 4. FIG. 4 is a diagram for describing details of the texture image. A texture image 330 includes a 3DoF region 331 and a "3DoF+" region 332. The texture image 330 includes an image that is a source of an omnidirectional video viewed from a viewpoint o, a viewpoint a, a viewpoint b, and a viewpoint c in a coordinate space 340. The 3DoF region 331 stores an image 333 at the position of the viewpoint o, the image 333 being a projected picture of a basic camera. The viewpoint position of the basic camera corresponds to an example of a "predetermined viewpoint position". The image 333 corresponds to an example of a "reference two-dimensional image".

Furthermore, the "3DoF+" region 332 stores patches that are complementary images for generating a projected picture at an arbitrary camera position within a limited range, such as an image 334 at the position of the viewpoint a, an image 335 at the position of the viewpoint b, and an image 336 at the position of the viewpoint c. The arbitrary camera viewpoint position within the limited range corresponds to an example of a "viewpoint position moved from the predetermined viewpoint position". The images 334 to 336 each correspond to an example of a "moved two-dimensional image". For the depth image as well, a depth map corresponding to information of each projected picture of the texture image is stored.

The atlas processing unit 102 generates the post decoding information for generating an image from each viewpoint position, that is, the images 333 to 336 from the viewpoints o and a to c, based on the texture image 330. The atlas processing unit 102 causes the post decoding information to include information indicating whether each image is an image in the 3DoF region of the texture image or an image generated using the "3DoF+" region of the texture image. Thereafter, the atlas processing unit 102 outputs, to the encoding unit 103, the atlas and the "3DoF+" metadata including the atlas arrangement parameter, the atlas ID, and the post decoding information.

The encoding unit 103 receives the atlas from the atlas processing unit 102. Furthermore, the encoding unit 103 receives the "3DoF+" metadata including the atlas arrangement parameter, the atlas ID, and the post decoding information from the data input unit 101. Next, the encoding unit 103 encodes the atlas and the "3DoF+" metadata by using multi-layer HEVC. The encoding unit 103 encodes the texture image to generate the texture layer. Furthermore, the encoding unit 103 generates the depth layer by encoding the depth image. That is, the encoded atlas includes the texture layer and the depth layer. Then, the encoding unit 103 outputs the encoded atlas and "3DoF+" metadata to a bitstream generating unit 104.

Figure 5:
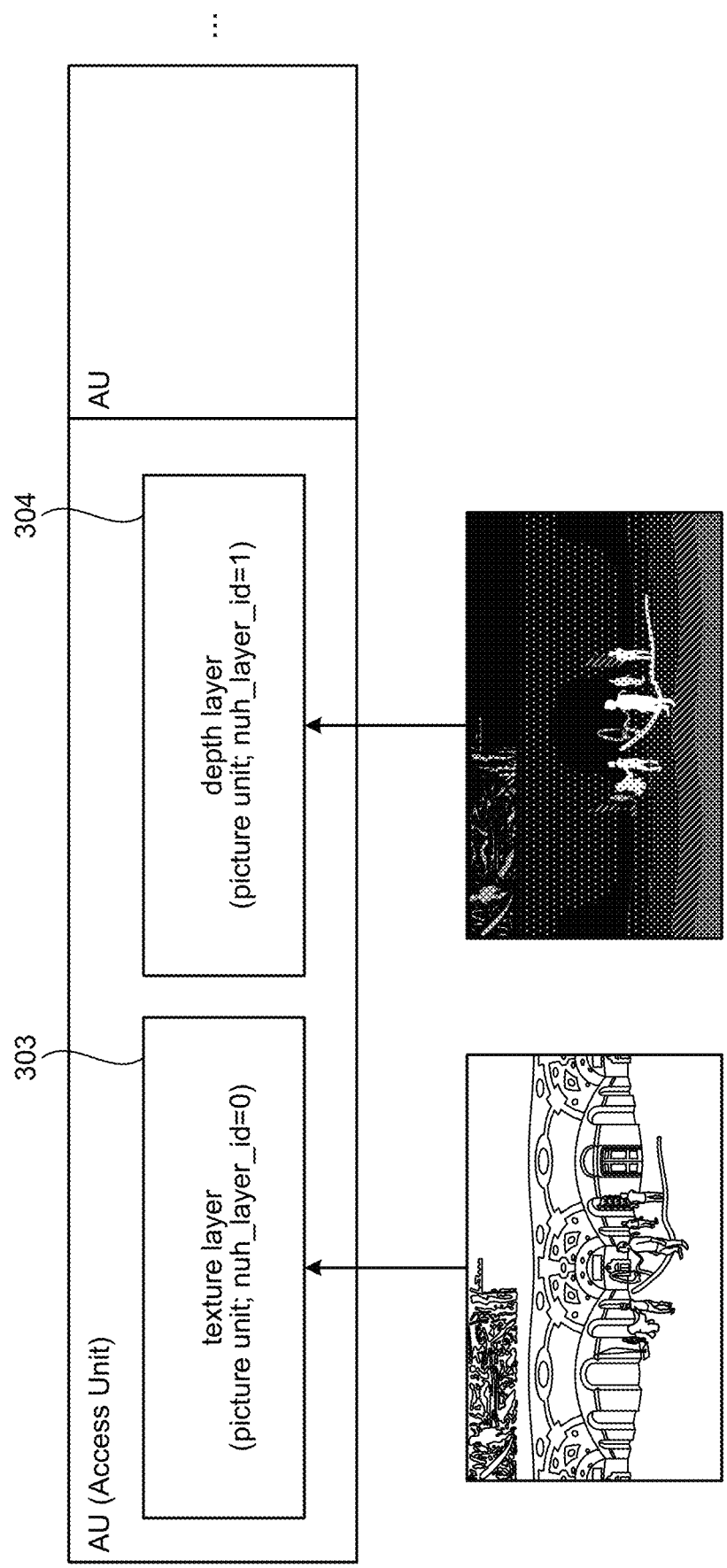
FIG. 5 is a diagram illustrating an example of a video stream.

The bitstream generating unit 104 receives the encoded atlas and the "3DoF+" metadata from the encoding unit 103. The bitstream generating unit 104 then generates a bitstream by arranging the atlas in time series and combining the corresponding "3DoF+" metadata. FIG. 5 is a diagram illustrating an example of a video stream. The atlas, which is a set of a texture layer 303 and a depth layer 304, is stored in time series in the video stream. A unit of data constituting one atlas included in the video stream is referred to as an access unit (AU). Then, the bitstream generating unit 104 outputs the generated bitstream to the file generating unit 105.

The file generating unit 105 receives the bitstream from the bitstream generating unit 104. Then, the file generating unit 105 stores the acquired bitstream in an ISOBMFF file for each segment to form a file, thereby generating a segment file of the bitstream. The storage in the ISOBMFF file will be described below.

The file generating unit 105 stores, in the ISOBMFF file, information indicating that the texture layer and the depth layer constituting the atlas are stored in one track. Specifically, the file generating unit 105 extends an operating point information sample group (oinf) and stores scalability_mask and dimension_identifier similarly to the VPS of HEVC, thereby defining the atlas ID which is a pair identifier of the texture layer and the depth layer constituting the atlas. FIG. 6 is a diagram illustrating an extension example of scalability_mask and dimension_identifier. For example, as illustrated in FIG. 6, the file generating unit 105 assigns the fifth bit of scalability_mask to the atlas ID.

Figure 7:
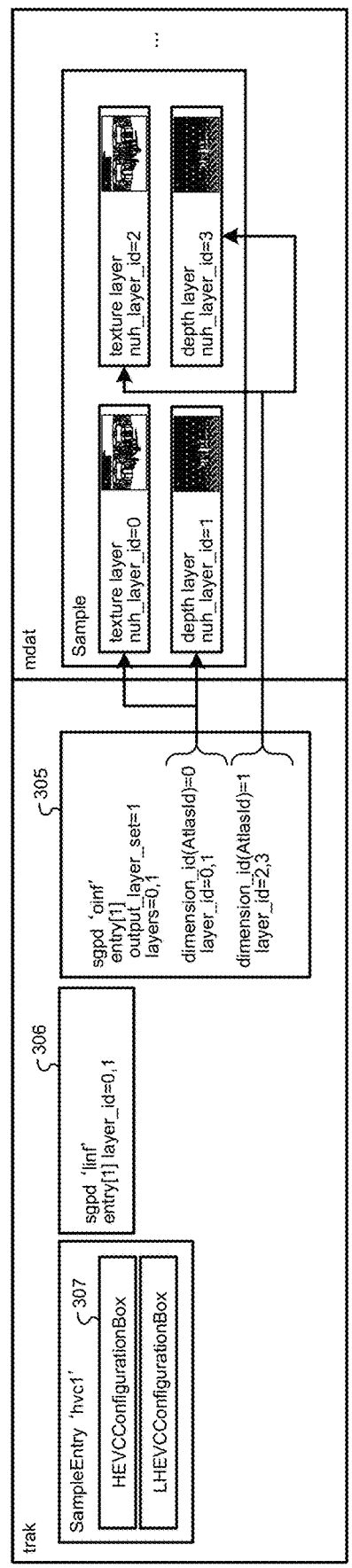
FIG. 7 is a diagram for describing association of an atlas ID.

Then, when storing the bitstream in the ISOBMFF file, the file generating unit 105 associates the atlas ID with a layer ID assigned to each texture layer and each depth layer. FIG. 7 is a diagram for describing the association of the atlas ID. When the bitstream of "3DoF+" is stored in the ISOBMFF file, L-HEVC storage (see ISO/IEC 14496-15) is available, and in this case, the bitstream is stored in the ISOBMFF file as illustrated in FIG. 6. Each access unit of the bitstream is treated as sampleEntry in the ISOBMFF file. In this case, the file generating unit 105 transmits the "3DoF+" metadata as a part of the stream when encoding is performed by using multimedia HEVC.

Figure 8:
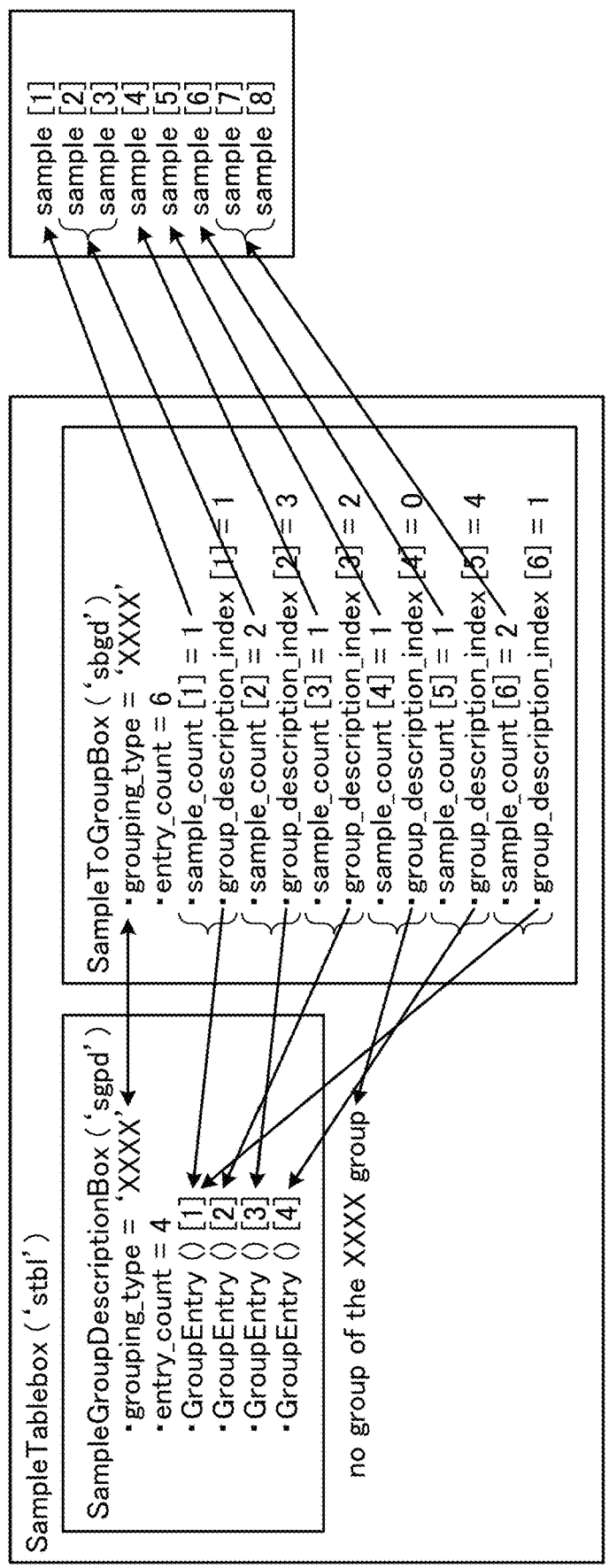
FIG. 8 is a diagram for describing a sample group.

Here, the file generating unit 105 groups samples, and associates metadata for each group by using a sample group in the ISOBMFF file. The file generating unit 105 stores the sample group in Moov of the ISOBMFF file. FIG. 8 is a diagram for describing the sample group. In the ISOBMFF file, each sample group is defined by SampleTableBox illustrated in FIG. 8. As illustrated in FIG. 8, grouping_Type of Sample To Group Box indicates Grouping_Type of Sample Group Description Box to be associated. In Sample To Group Box, sample_count and group_description_index are registered for one entry. group_description_index indicates an index of associated GroupEntry. Furthermore, sample_count indicates the number of samples belonging to the GroupEntry.

Then, the file generating unit 105 generates an operating points information (oinf) sample group 305 and a layer Information (linf) sample group 306 illustrated in FIG. 7 as the sample groups.

FIG. 9 is a diagram illustrating an example of the oinf sample group. The file generating unit 105 registers, in the oinf sample group, a layer included in an operating point, and a profile, level, and tier of each layer by a syntax 321. In addition, the file generating unit 105 registers, in the oinf sample group, information included in the operating point, such as information on maximum and minimum widths and maximum and minimum heights, and information regarding a frame rate and a bit rate by a syntax 322. Further, the file generating unit 105 registers, in the oinf sample group, information on the dependency and type of a non-base layer by a syntax 323. Here, the file generating unit 105 indicates the type by using scalability_mask and dimention_identifier illustrated in FIG. 6. The file generating unit 105 stores the atlas ID as the type. That is, the file generating unit 105 stores the atlas ID in the oinf sample group represented as sgpd'oinf'. In this manner, the oinf sample group 305 stores information on collection of samples having the same attribute.

The file generating unit 105 associates each atlas ID with the texture layer and the depth layer as illustrated in FIG. 7 by associating the atlas ID with the layer ID in the oinf sample group. In FIG. 7, an atlas ID "0" is associated with a texture layer whose layer ID is "0" and a depth layer whose layer ID is "1". In addition, an atlas ID "1" is associated with a texture layer whose layer ID is "2" and a depth layer whose layer ID is "3".

As described above, by storing the information indicating that the atlas including the texture layer and the depth layer is stored in the oinf sample group, the client device 2 can grasp the texture layer and the depth layer before decoding ES. That is, the client device 2 can select and decode a layer that can be rendered by the client device 2, and processing overheads can be reduced. For example, the client device 2 that can decode the "3DoF+" stream and perform 3DoF rendering, but does not support "3DoF+" rendering can easily select the texture layer.

In addition, the file generating unit 105 stores, in the linf sample group 306, the layer ID of the layer included in the track and information indicating which sublayer of the layer indicated by the layer ID is included. FIG. 10 is a diagram illustrating an example of the linf sample group. In FIG. 10, layer_id represents the layer ID, and this value corresponds to nuh_layer_id in each sample.

Further, the file generating unit 105 stores, in the ISOBMFF file, the post decoding information which is metadata for generating the omnidirectional video from the two-dimensional data. By using the post decoding information stored in the ISOBMFF file, the client device 2 can perform the "3DoF+" rendering or 3DoF rendering.

Figure 11:
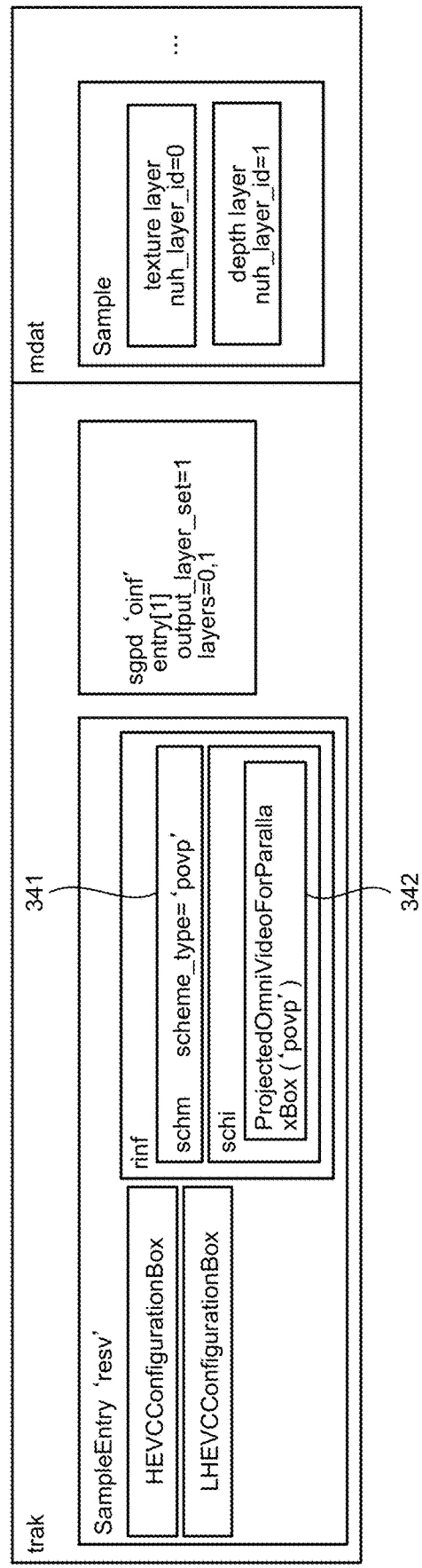
FIG. 11 is a diagram for describing storage of post decoding information.

For example, the file generating unit 105 stores the post decoding information as illustrated in FIG. 11. FIG. 11 is a diagram for describing the storage of the post decoding information. As illustrated in FIG. 11, the file generating unit 105 indicates that the content stored in the track as scheme_type='povp' in SchemeTypeBox 341 is the "3DoF+" stream. In addition, the file generating unit 105 may define a new flag indicating that the content is the "3DoF+" stream and store the new flag in SampleEntry. Moreover, the file generating unit 105 defines, for example, ProjectedOmniVideoForParallaxBox as a new box 342 having the post decoding information for each viewpoint position in SchemeInformationBox.

FIG. 12 is a diagram illustrating an example of a syntax of ProjectedOmniVideoForParallaxBox. As illustrated in FIG. 12, the file generating unit 105 stores ProjectionInfoBox in ProjectedOmniVideoForParallaxBox for registering the post decoding information corresponding to the number of viewpoint positions. Post decoding information indicating that the image is an image using the "3DoF+" region is an example of "first post decoding information", and ProjectionInfoBox that stores the post decoding information is an example of a "first box". Post decoding information indicating that the image is an image of the 3DoF region is an example of "second post decoding information", and ProjectionInfoBox that stores the post decoding information corresponds to an example of a "second box".

FIG. 13 is a diagram illustrating an example of a syntax of ProjectionInfoBox. Further, FIG. 14 is a diagram illustrating an example of syntaxes of CameraPosStruct, DepthQuantizationStruct, ProjectionFormatStruct, RotationStruct, and RefionWisePackingStruct in ProjectionInfoBox.

ProjectionInfoBox calls CameraPosStruct, DepthQuantizationStruct, ProjectionFormatStruct, RotationStruct, and RegionWisePackingStruct, which are represented by syntaxes 351 to 355 illustrated in FIG. 14. The file generating unit 105 newly defines CameraPosStruct and DepthQuantizationStruct. CameraPosStruct stores the viewpoint position. ViewpointPosStruct may be used as CameraPosStruct. DepthQuantizationStruct stores a depth quantization parameter. The file generating unit 105 extends projection_type in ProjectionFormatStruct to include Perspective projection as shown in a table 357. RegionWisePackingStruct calls RectRegionPacking, which is represented by a syntax 356. RegionWisePackingStruct stores patch position information of the atlas. That is, RegionWisePackingStruct is information indicating in which texture layer each patch is included.

Since it is assumed that CameraPosStruct, ProjectionFormatStruct, and RotationStruct in ProjectionInfoBox do not dynamically change, by storing them as metadata in the ISOBMFF file instead of in the "3DoF+" stream, a redundant description can be avoided and the number of bits can be reduced. In addition, in a case where RegionWisePackingStruct and DepthQuantizationStruct in ProjectionInfoBox do not dynamically change, by storing them as metadata in the ISOBMFF file, a redundant description can be avoided and the number of bits can be reduced. Furthermore, in a case where RegionWisePackingStruct and DepthQuantizationStruct dynamically change, the file generating unit 105 stores an initial value in the ISOBMFF file. Furthermore, the file generating unit 105 can also reduce the number of bits by adding a flag indicating whether or not each of ProjectionFormatStruct( ) and DepthQuantizationStruct( ) is the same between the viewpoints, and registering them outside a loop of num_cameras in a case where each of ProjectionFormatStruct( ) and DepthQuantizationStruct( ) is the same between the viewpoints.

Here, the file generating unit 105 may generate ProjectionInfoBox and RegionWisePackingStruct as illustrated in FIG. 15. FIG. 15 is a diagram illustrating another example of the syntax of ProjectionInfoBox and RegionWisePackingStruct. In a case of ProjectionInfoBox indicated by a syntax 361 in FIG. 15, RegionWisePackingStruct indicated by a syntax 362 is called. In RegionWisePackingStruct, the atlas ID can be written at a predetermined position in a specific texture layer by unsigned_int(8) atlas_id.

Furthermore, the file generating unit 105 extends ProjectionInfoBox as illustrated in FIG. 16 to indicate a viewpoint position where the 3DoF rendering is possible. FIG. 16 is a diagram illustrating an example of a syntax of ProjectionInfoBox extended to indicate the viewpoint position where the 3DoF rendering is possible. In the syntax illustrated in FIG. 16, in a case where the value of is_3DoF_compatible is 0, the 3DoF rendering is not supported, and in a case where the value is 1, the 3DoF rendering is possible. That is, the client device 2 can check the viewpoint position where the 3DoF rendering is possible among the viewpoint positions having the value of num_cameras by ProjectionInfoBox. As a result, the client device 2 that supports the 3DoF rendering, but does not support the "3DoF+" rendering can render the 3DoF region of the "3DoF+" stream.

Returning to FIG. 2, the description will be continued. The file generating unit 105 outputs the ISOBMFF file storing the post decoding information at each viewpoint position and the atlas ID associated with the layer ID to the transmission unit 106 by ProjectionInfoBox described above.

The transmission unit 106 receives the ISOBMFF file storing the post decoding information at each viewpoint position and the atlas ID associated with the layer ID from the file generating unit 105 by ProjectionInfoBox. Then, the transmission unit 106 transmits and uploads the acquired ISOBMFF file to the web server 3.

Configuration of Client Device According to First Embodiment

Figure 17:
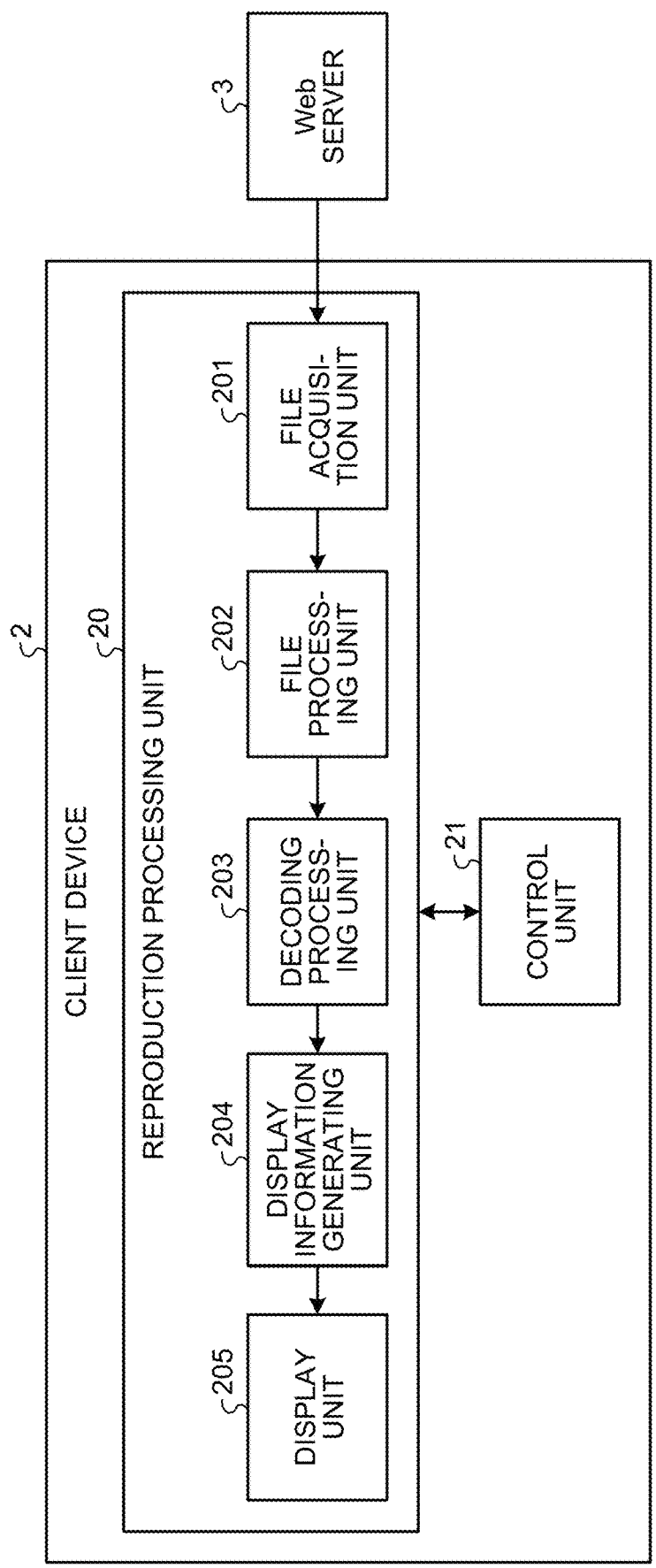
FIG. 17 is a block diagram of a client device.
Figure 18:
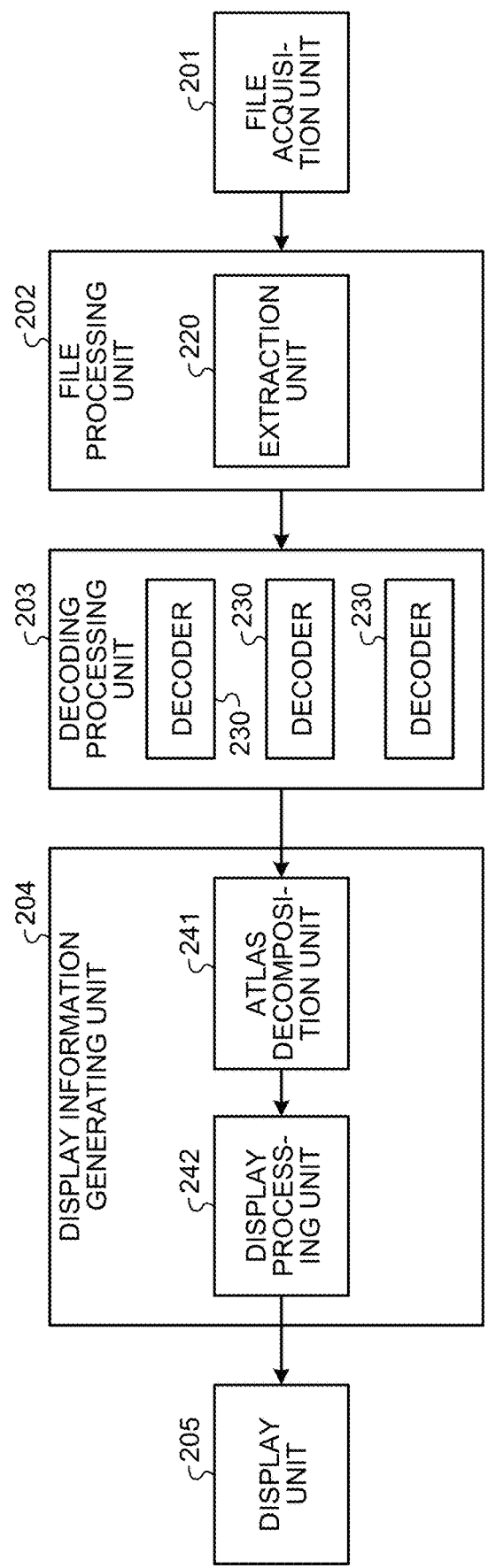
FIG. 18 is a block diagram illustrating details of a file processing unit, a decoding processing unit, and a display information generating unit.

FIG. 17 is a block diagram of the client device. FIG. 18 is a block diagram illustrating details of a file processing unit, a decoding processing unit, and a display information generating unit.

As illustrated in FIG. 17, the client device 2 includes a reproduction processing unit 20 and a control unit 21. The control unit 21 controls an operation of each unit of the reproduction processing unit 20. For example, the control unit 21 integrally controls a timing of the operation of each unit of the reproduction processing unit 20. The reproduction processing unit 20 includes a file acquisition unit 201, a file processing unit 202, a decoding processing unit 203, a display information generating unit 204, and a display unit 205.

The file acquisition unit 201 accesses the web server 3 and acquires the ISOBMFF file in which a scene description of a 6DoF content to be displayed is stored. Then, the file acquisition unit 201 outputs the ISOBMFF file in which the scene description is stored to the file processing unit 202.

The file acquisition unit 201 accesses the web server 3 and acquires the ISOBMFF file storing the "3DoF+" stream to be displayed. Then, the file acquisition unit 201 outputs the ISOBMFF file storing the "3DoF+" stream to the file processing unit 202.

As illustrated in FIG. 18, the file processing unit 202 includes an extraction unit 220. The file processing unit 202 receives the ISOBMFF file storing the "3DoF+" stream from the file acquisition unit 201. Then, the extraction unit 220 of the file processing unit 202 parses the ISOBMFF file and extracts data of the bitstream. Thereafter, the extraction unit 220 outputs the data of the bitstream to the decoding processing unit 203.

Here, the file processing unit 202 determines whether or not the content stored in the track is the "3DoF+" stream by parsing the acquired ISOBMFF file. For example, the file processing unit 202 checks scheme_type of SchemeTyepBox in FIG. 11 and determines whether or not the content is the "3DoF+" stream. Then, in a case where the decoding processing unit 203 does not support decoding of the "3DoF+" stream, the file processing unit 202 notifies of an error and stops the processing in a case where the content stored in the track is the "3DoF+" stream.

Furthermore, in a case where the decoding processing unit 203 supports the decoding of the "3DoF+" stream, but the display information generating unit 204 does not support the "3DoF+" rendering, the file processing unit 202 acquires the viewpoint position where the 3DoF rendering is possible. Then, the file processing unit 202 instructs the decoding processing unit 203 to decode the texture layer, and transmits the viewpoint position where the 3DoF rendering is possible and the post decoding information of the viewpoint position.

As illustrated in FIG. 18, the decoding processing unit 203 includes a plurality of decoders 230. The decoding processing unit 203 receives the data of the bitstream from the file processing unit 202. Then, the decoding processing unit 203 performs decoding processing on the data of the bitstream acquired by using the decoder 230. Thereafter, the decoding processing unit 203 outputs the decoded data of the bitstream to the display information generating unit 204.

Furthermore, in a case where the display information generating unit 204 does not support the "3DoF+" rendering, the decoding processing unit 203 receives, from the decoding processing unit 203, an instruction to decode the texture layer. Furthermore, the decoding processing unit 203 receives the viewpoint position where the 3DoF rendering is possible and the post decoding information of the viewpoint position. Then, the decoding processing unit 203 decodes the texture layer of the "3DoF+" stream. Thereafter, the decoding processing unit 203 outputs, to the display information generating unit 204, the decoded texture layer, the viewpoint position where the 3DoF rendering is possible, and the post decoding information of the viewpoint position.

As illustrated in FIG. 18, the display information generating unit 204 includes an atlas decomposition unit 241 and a display processing unit 242. The display information generating unit 204 receives the decoded bitstream from the decoding processing unit 203. Then, the atlas decomposition unit 241 of the display information generating unit 204 decomposes the texture layer and the depth layer of each decoded atlas. Then, the atlas decomposition unit 241 outputs the decomposed atlas to the display processing unit 242.

Furthermore, in a case of not supporting the "3DoF+" rendering, the display information generating unit 204 receives, from the decoding processing unit 203, the decoded texture layer, the viewpoint position where the 3DoF rendering is possible, and the post decoding information of the viewpoint position. Then, the atlas decomposition unit 241 outputs, to the display processing unit 242, the decoded texture layer, the viewpoint position where the 3DoF rendering is possible, and the post decoding information of the viewpoint position.

The display processing unit 242 receives the decomposed atlas from the atlas decomposition unit 241. Furthermore, the display processing unit 242 receives the viewpoint position and a line-of-sight direction from an input device (not illustrated). Then, the display processing unit 242 performs the "3DoF+" rendering according to the input viewpoint position and line-of-sight direction to generate the "3DoF+" image for display. Thereafter, the display processing unit 242 supplies the generated "3DoF+" image for display to a display unit 207.

Furthermore, in a case of not supporting the "3DoF+" rendering, the display processing unit 242 receives, from the atlas decomposition unit 241, the coded texture layer, the viewpoint position where the 3DoF rendering is possible, and the post decoding information of the viewpoint position. Furthermore, the display processing unit 242 receives the viewpoint position and a line-of-sight direction from an input device (not illustrated). Then, the display processing unit 242 acquires data from the 3DoF region of the texture layer corresponding to the input viewpoint position, performs the 3DoF rendering according to the line-of-sight direction, and generates a 3DoF image for display. Thereafter, the display processing unit 242 supplies the generated 3DoF image for display to the display unit 207.

The display unit 205 includes a display device such as a monitor. The display unit 205 receives the image for display generated by the display information generating unit 204. Then, the display unit 205 causes the display device to display the acquired image for display.

File Generation Procedure According to First Embodiment

Figure 19:
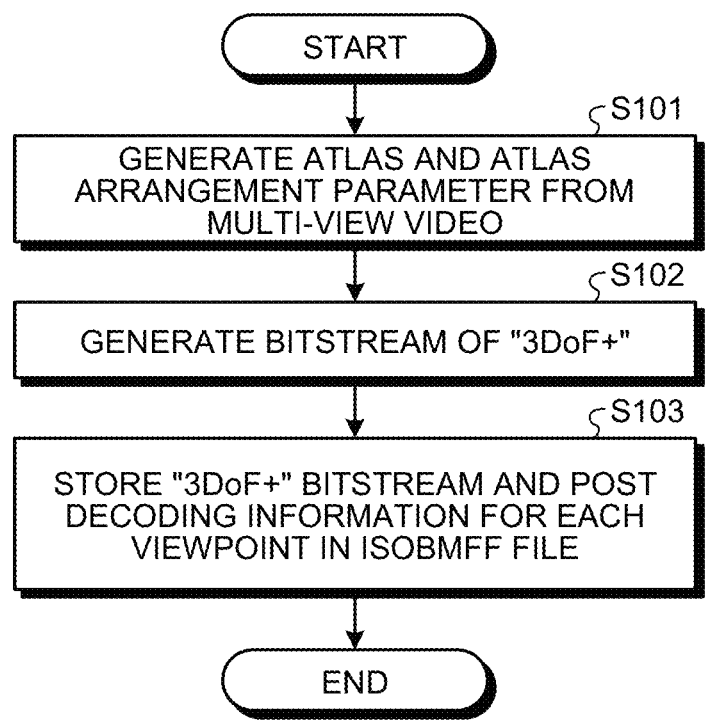
FIG. 19 is a flowchart of file generation processing performed by the file generation device according to a first embodiment.

Next, a flow of file generation processing performed by the file generation device 1 according to the first embodiment will be described in detail with reference to FIG. 19. FIG. 19 is a flowchart of the file generation processing performed by the file generation device according to the first embodiment.

The atlas processing unit 102 receives the image data of the "3DoF+" video and the "3DoF+" metadata from the data input unit 101. Then, the atlas processing unit 102 generates the atlas and the atlas arrangement parameter from the image data of the "3DoF+" video and the "3DoF+" metadata (Step S101). In addition, the atlas processing unit 102 generates the atlas ID and the post decoding information. Then, the atlas processing unit 102 outputs the atlas and the "3DoF+" metadata including the atlas ID, the post decoding information, and the atlas arrangement parameter to the encoding unit 103.

The encoding unit 103 encodes the atlas, and the "3DoF+" metadata including the atlas ID, the post decoding information, and the atlas arrangement parameter, and outputs the encoded atlas and "3DoF+" metadata to the bitstream generating unit 104. The bitstream generating unit 104 generates the bitstream of "3DoF+" by using the encoded atlas and "3DoF+" metadata (Step S102). Thereafter, the encoding unit 103 outputs the generated bitstream to the file generating unit 105.

Next, the file generating unit 105 stores, in the ISOBMFF file, information associating the atlas ID with the layer ID, the post decoding information for each viewpoint position, and the bitstream (Step S103). Thereafter, the file generating unit 105 outputs the ISOBMFF file to the transmission unit 106. The transmission unit 106 outputs the ISOBMFF file generated by the file generating unit 105 to the web server 3.

Reproduction Processing Procedure According to First Embodiment

Figure 20:
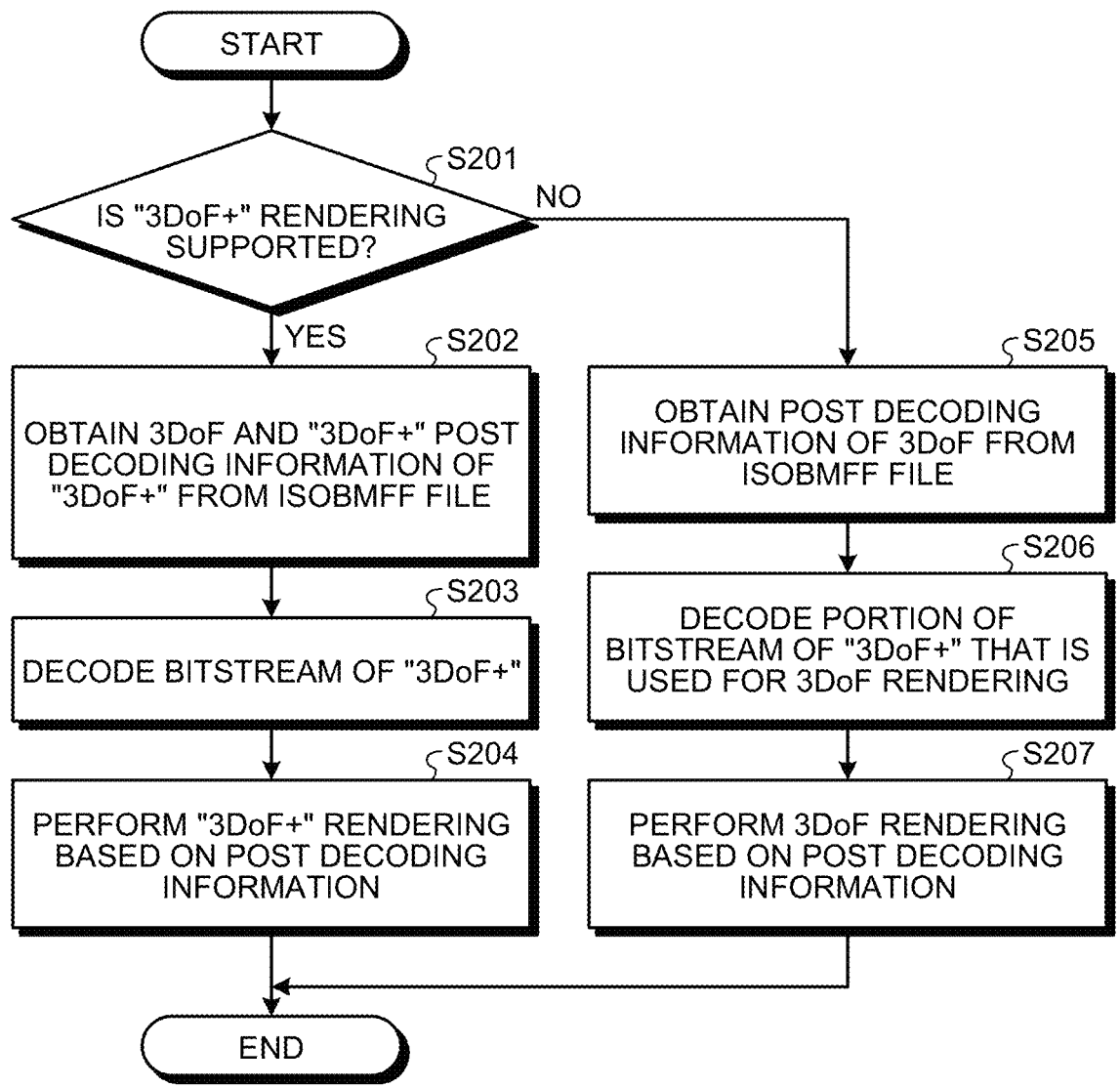
FIG. 20 is a flowchart of reproduction processing performed by the client device according to the first embodiment.

Next, a flow of reproduction processing performed by the client device 2 according to the present embodiment will be described with reference to FIG. 20. FIG. 20 is a flowchart of the reproduction processing performed by the client device according to the first embodiment. Here, a case where the decoding processing unit 203 can decode the "3DoF+" stream will be described.

The file processing unit 202 acquires, from the web server 3, the ISOBMFF file corresponding to the "3DoF+" stream to be reproduced via the file acquisition unit 201. Next, the file processing unit 202 determines whether or not the display information generating unit 204 of the client device 2 supports the "3DoF+" rendering (Step S201).

In a case where the display information generating unit 204 of the client device 2 supports the "3DoF+" rendering (Step S201: Yes), the file processing unit 202 parses the ISOBMFF file and acquires the post decoding information of 3DoF and "3DoF+" (Step S202). Further, the file processing unit 202 extracts the bitstream of "3DoF+" from the ISOBMFF file. Then, the file processing unit 202 outputs the extracted bitstream of "3DoF+" and the post decoding information of 3DoF and "3DoF+" to the decoding processing unit 203.

The decoding processing unit 203 receives the bitstream of "3DoF+" and the post decoding information of 3DoF and "3DoF+" from the file processing unit 202. Then, the decoding processing unit 203 decodes the bitstream of "3DoF+" (Step S203). Thereafter, the decoding processing unit 203 outputs the decoded data of the bitstream and post decoding information to the display information generating unit 204.

The display information generating unit 204 receives the data of the bitstream and the post decoding information of 3DoF and "3DoF+" from the decoding processing unit 203. Furthermore, the display information generating unit 204 receives the viewpoint position and the line-of-sight direction from the input device. Then, the display information generating unit 204 performs the "3DoF+" rendering by using the post decoding information and information regarding the viewpoint position and the line-of-sight direction, and generates the "3DoF+" image for display (Step S204). Thereafter, the display information generating unit 204 performs viewing processing of causing the display unit 205 to display the "3DoF+" image by transmitting the "3DoF+" image.

On the other hand, in a case where the display information generating unit 204 of the client device 2 does not support the "3DoF+" rendering (Step S201: No), the file processing unit 202 parses the ISOBMFF file and acquires the post decoding information of 3DoF (Step S205). Further, the file processing unit 202 extracts the bitstream of "3DoF+" from the ISOBMFF file. Then, the file processing unit 202 outputs the extracted bitstream of "3DoF+" and the post decoding information of 3DoF to the decoding processing unit 203, and instructs encoding of the texture layer.

The decoding processing unit 203 receives the bitstream of "3DoF+" and the post decoding information of 3DoF from the file processing unit 202. Then, the decoding processing unit 203 decodes a portion of the bitstream of "3DoF+" that is used for the 3DoF rendering (Step S206). That is, the decoding processing unit 203 decodes the texture layer of the bitstream of "3DoF+". Thereafter, the decoding processing unit 203 outputs the decoded data of the bitstream and the post decoding information of 3DoF to the display information generating unit 204.

The display information generating unit 204 receives the data of the bitstream and the post decoding information of 3DoF from the decoding processing unit 203. Furthermore, the display information generating unit 204 receives the viewpoint position and the line-of-sight direction from the input device. Then, the display information generating unit 204 performs the 3DoF rendering by using the post decoding information and the information regarding the viewpoint position and the line-of-sight direction, and generates the 3DoF image for display (Step S207). Thereafter, the display information generating unit 204 performs the viewing processing of causing the display unit 205 to display the 3DoF image by transmitting the 3DoF image.

As described above, the file generation device according to the present embodiment stores, in the ISOBMFF file, the information indicating that the atlas including the texture layer and the depth layer is stored. In addition, the file generation device stores, in the ISOBMFF file, the information indicating whether or not the stored content is the "3DoF+" stream and the post decoding information for each viewpoint position. The post decoding information stores the information indicating the viewpoint position where the 3DoF rendering is possible. As a result, the client device can determine whether or not the content is the "3DoF+" stream and easily acquire data of a layer corresponding to the capability of the client device itself. Further, in a case of not supporting the "3DoF+" rendering, the client device can generate an image for display by using the 3DoF rendering. Therefore, an image according to the display processing capability of the client device can be provided and displayed, and the viewing experience of the user can be expanded.

1.1 Modified Example of First Embodiment

Figure 21:
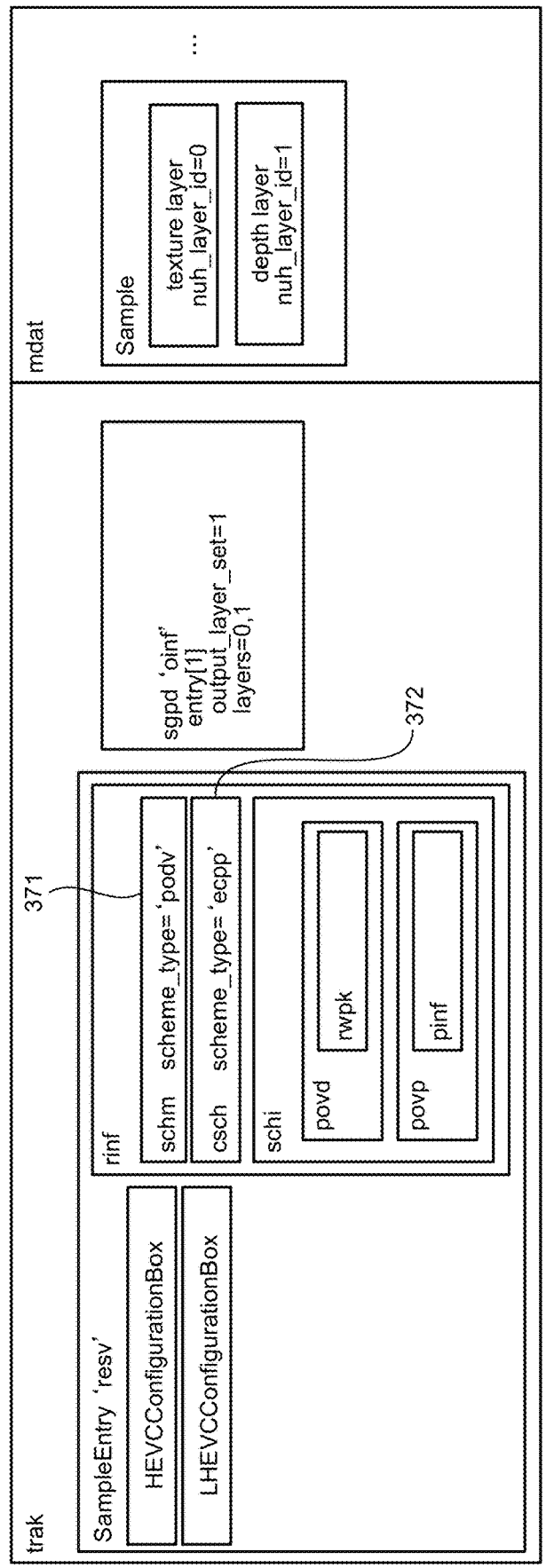
FIG. 21 is a diagram illustrating an example of an ISOBMFF file according to a modified example of the first embodiment.

The file generation device according to the present modified example is different from the first embodiment in that the post decoding information regarding each of the 3DoF region and the "3DoF+" region is stored in an individual box. FIG. 21 is a diagram illustrating an example of an ISOBMFF file according to the modified example of the first embodiment.

The file generating unit 105 stores scheme_type='podv' in SchemeTypeBox as illustrated in a box 371 in FIG. 21. This makes it possible to approximate the structure of OMAF ed. 1. Then, the file generating unit 105 stores the post decoding information of the 3DoF region in podv. With this configuration, scheme_type='podv' indicates that the post decoding information of the 3DoF region is stored. Furthermore, the file generating unit 105 stores information for enabling the rendering of the 3DoF region using rwpk in podv.

Further, the file generating unit 105 stores scheme_type='ecpp' in CompatibleSchemeTypeBox as illustrated in a box 372. Then, the file generating unit 105 stores the post decoding information of the "3DoF+" region in ecpp. Furthermore, the file generating unit 105 stores information that enables the rendering of the "3DoF+" region using pinf in povp. However, the file generating unit 105 may store the post decoding information of both the 3DoF region and the "3DoF+" region in pinf in povp.

As described above, the file generation device according to the present embodiment stores the post-coding information of the 3DoF region and the post-coding information of the "3DoF+" region in different boxes. As a result, even in a case where the texture layer is reproducible and the decoding of the "3DoF+" stream is not supported, a file generation device that can ignore the depth layer can perform the decoding and rendering on only the 3DoF region.

2. Second Embodiment

A file generation device according to the present embodiment is different from that of the first embodiment in that the texture layer and the depth layer are stored in individual tracks, respectively. The file generation device according to the present embodiment is also represented by the block diagram of FIG. 2. In the following description, a description of an operation of each unit similar to that of the first embodiment may be omitted.

Figure 22:
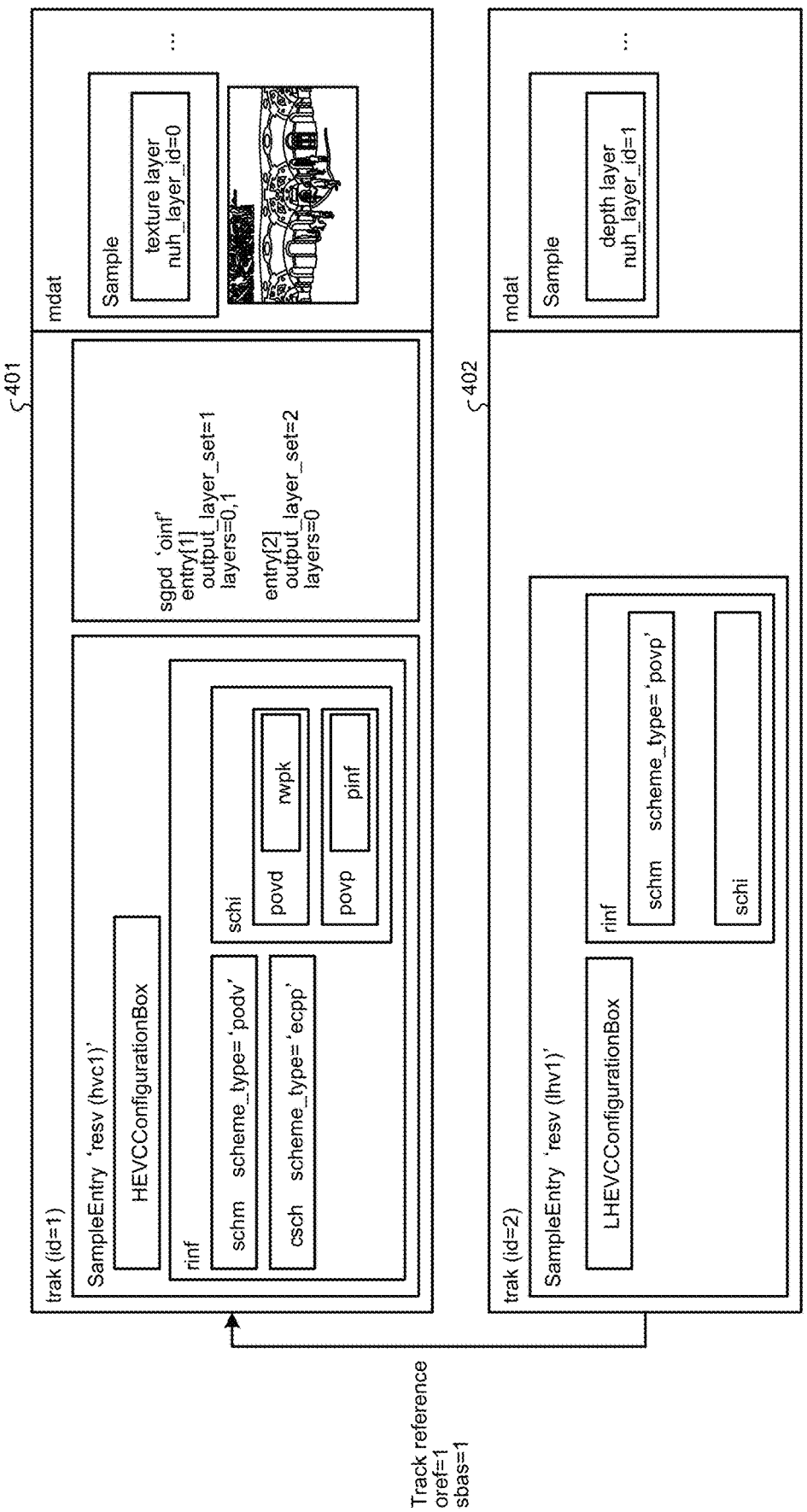
FIG. 22 is a diagram illustrating an example of an ISOBMFFF file according to a second embodiment.

A file generating unit 105 uses the L-HEVC storage technology to store the texture layer and the depth layer in individual tracks, respectively. FIG. 22 is a diagram illustrating an example of an ISOBMFFF file according to the second embodiment.

Specifically, the file generating unit 105 stores the texture layer in a track box with id=1 indicated by a box 401. In addition, the file generating unit 105 stores the depth layer in a track box with id=2 indicated by a box 402. Then, the file generating unit 105 can refer to a texture track of the box 401 from a depth layer track of the box 402 by using a Track reference.

Then, the file generating unit 105 stores scheme type='podv' in SchemeTyeBox in the texture layer track of the box 401. Further, the file generating unit 105 stores the post decoding information of the 3DoF region in povd. The post decoding information in the 3DoF region corresponds to an example of "first identification information". With this configuration, scheme_type='podv' indicates that the post decoding information of the 3DoF region is stored. Furthermore, the file generating unit 105 stores information that enables the rendering of the 3DoF region using rwpk.

Further, the file generating unit 105 stores scheme type='ecpp' in CompatibleSchemeTyeBox in the texture layer track of the box 401. Further, the file generating unit 105 stores scheme type='povp' in the depth layer track of the box 402. Then, the file generating unit 105 stores the post decoding information of the "3DoF+" region in povp. The post decoding information of "3DoF+" corresponds to an example of "second identification information". For example, the file generating unit 105 stores the post decoding information of the "3DoF+" region in pinf in povp of the texture layer track of the box 401. In addition, the file generating unit 105 stores the post decoding information of the 3DoF region and the "3DoF+" region in pinf in povp of the depth layer track of the box 402.

In a case where the "3DoF+" stream can be decoded and rendered, the file processing unit 202 of the client device 2 reproduces the "3DoF+" video by using both the texture layer track and the depth layer track. In this case, the file processing unit 202 refers to povp stored in schi in the texture layer track of the box 401 to acquire the post decoding information of the "3DoF+" region.

On the other hand, in a case where the decoding of the "3DoF+" stream is not supported, the file processing unit 202 reproduces the 3DoF video by using the post decoding information of the 3DoF region and the 3DoF region stored in the texture layer track.

As described above, the file generation device according to the present embodiment stores the texture layer and the depth layer in individual tracks. As a result, even a client device that does not support the decoding of the "3DoF+" stream can reproduce a 3DoF omnidirectional video by using the track of the texture layer.

2.1 Modified Example of Second Embodiment

A delivery system according to the present modified example is different from that of the second embodiment in that the client device 2 refers to prop stored in schi in the depth layer track at the time of performing the "3DoF+" rendering. Hereinafter, a file generation device 1 according to the present modified example will be described.

A file generating unit 105 of the file generation device 1 newly defines scheme_type indicating reference to povp stored in schi in the depth layer track when performing the "3DoF+" rendering. Then, the file generating unit 105 stores the newly defined scheme_type as scheme_type of CompatibleSchemeTypeBox in the texture layer track.

In a case where the "3DoF+" stream can be decoded and rendered, the file processing unit 202 of the client device 2 reproduces the "3DoF+" video by using both the texture layer track and the depth layer track. In this case, the file processing unit 202 refers to sheme_type of CompatibleSchemeTypeBox in the texture layer track to check an instruction to refer to povp stored in schi in the depth layer track. Then, the file processing unit 202 refers to povp stored in schi in the depth layer track to acquire the post decoding information of the "3DoF+" region.

As described above, in the delivery system according to the present embodiment, the client device refers to prop stored in schi in the depth layer track to acquire the post decoding information of the "3DoF+" region, and performs the "3DoF+" rendering. As a result, it is possible to satisfy the profile specified in OMAF ed. 1.

3. Third Embodiment

A file generation device according to the present embodiment is different from that of the second embodiment in that the "3DoF+" region and the 3DoF region of the texture layer are divided and each stored in one track. The file generation device according to the present embodiment is also represented by the block diagram of FIG. 2. In the following description, a description of an operation of each unit similar to that of the first and second embodiments may be omitted.

A file generating unit 105 divides the "3DoF+" region and the 3DoF region of the texture layer. Further, the file generating unit 105 divides a region corresponding to the "3DoF+" region of the texture layer and a region corresponding to the 3DoF region in the depth layer. Hereinafter, the region corresponding to the "3DoF+" region of the texture layer and the region corresponding to the 3DoF region in the depth layer are referred to as a ""3DoF+" region of the depth layer" and a "3DoF region of the depth layer", respectively. The file generating unit 105 associates the "3DoF+" region and the 3DoF region of the texture layer with each other by using the Track reference. In addition, the file generating unit 105 associates the "3DoF+" region and the 3DoF region of the depth layer with each other by using the Track reference.

Figure 23:
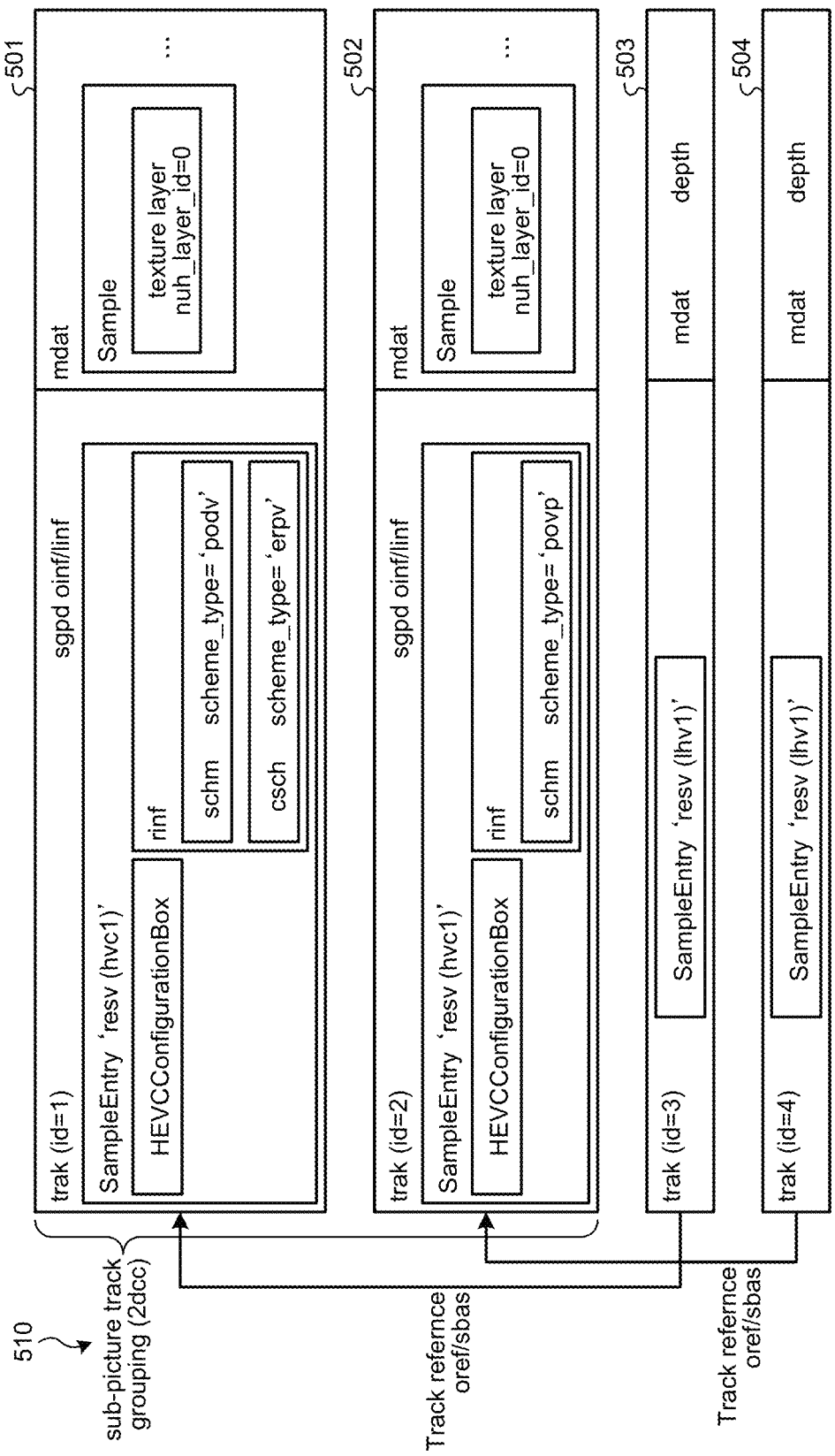
FIG. 23 is a diagram illustrating an example of an ISOBMFFF file according to a third embodiment.

Then, as illustrated in FIG. 23, the file generating unit 105 stores the "3DoF+" region and the 3DoF region of the texture layer in MoovBox of individual tracks 501 and 503, respectively. Further, the file generating unit 105 stores the "3DoF+" region and the 3DoF region of the depth layer in MoovBox of individual tracks 502 and 504, respectively. FIG. 23 is a diagram illustrating an example of an ISOBMFFF file according to the third embodiment.

Next, the file generating unit 105 stores division information of each layer in sub-picture track grouping which is another track group 510. In this case, the file generating unit 105 may store the division information of each layer by a tile base track/tile track mechanism. In addition, the file generating unit 105 registers a list of base tracks, which serve as bases, in sub-picture track grouping. For example, in a case where the texture layer tracks of the tracks 501 and 503 are the base tracks, the file generating unit 105 registers information of the texture layer tracks of the tracks 501 and 503 in sub-picture track grouping. In this case, it is possible to identify that the track 501 is a track storing the 3DoF region of the texture layer by Scheme_type='podv' of SchemeTypeBox in the texture track of the track 501. Information indicating that the information is the information of the 3DoF region, represented by Scheme_type='podv', corresponds to an example of the "first identification information". Further, the information indicating that the information is the information of the "3DoF+" region, represented by Scheme_type='povp', corresponds to an example of the "second identification information". Scheme_type='povp' is generated by an atlas processing unit 102 so as to be included in the post decoding information, for example, by the atlas processing unit 102.

In a case where the "3DoF+" stream can be decoded and rendered, the file processing unit 202 of the client device 2 refers to sub-picture track grouping to acquire the division information of each layer, thereby specifying a corresponding track. Then, the file processing unit 202 reproduces the "3DoF+" video by using the texture layer track and the depth layer track of the "3DoF+" region and the 3DoF region.

On the other hand, in a case where the decoding of the "3DoF+" stream is not supported, the file processing unit 202 checks Scheme_type='podv' of SchemeTypeBox in the texture track of the track 501, and confirms that the track 501 is a track storing the 3DoF region of the texture layer. Then, the file processing unit 202 reproduces the 3DoF video by using the post decoding information of the 3DoF region and the 3DoF region stored in the texture layer track of the 3DoF region of the track 501.

Here, in the present embodiment, the depth layer is also divided into the "3DoF+" region and the 3DoF region, but the file generating unit 105 may store the depth layer in one track without dividing the depth layer into the regions.

In addition, the file generating unit 105 may store the "3DoF+" region and the 3DoF region of the depth layer and the "3DoF+" region of the texture layer in one track. In this case, the file generating unit 105 stores two ProjectionInfoBox for the texture layer and the depth layer in a track in which the "3DoF+" region and the 3DoF region of the depth layer and the "3DoF+" region of the texture layer are stored.

Furthermore, the file generating unit 105 can also divide the "3DoF+" region for each patch group constituting each viewpoint position and individually store the divided "3DoF+" region in the track. In this case, the file generating unit 105 can also store ViewingSpaceBox in each track and register a movable range of the viewpoint at the time of viewing the stream stored in the track.

As described above, the file generation device according to the present embodiment divides the "3DoF+" region and the 3DoF region of the texture layer and individually stores each of the regions in one track. As a result, even a client device that does not support the decoding of the "3DoF+" stream can reproduce the 3DoF omnidirectional video by using the track storing the 3DoF region of the texture layer. In addition, the profile specified in OMAF ed. 1 can be satisfied.

3.1 Modified Example (1) of Third Embodiment

A delivery system according to the present modified example is different from that of the second embodiment in that sub-picture track grouping includes information indicating whether or not a stream stored in each track is the 3DoF region of the texture layer. Hereinafter, a file generation device 1 according to the present modified example will be described.

FIG. 24 is a diagram illustrating an example of a syntax of sub-picture track grouping according to the modified example (1) of the third embodiment. As illustrated in FIG. 24, a file generating unit 105 stores ThreeDoFCompatibleBox( ) indicating that the stored stream is the 3DoF region of the texture layer in sub-picture track grouping. ThreeDoFCompatibleBox( ) is empty and indicates that the stream stored in the track in which ThreeDoFCompatibleBox( ) exists is the 3DoF region of the texture layer.

Here, in the present modified example, ThreeDoFCompatibleBox( ) is used to indicate that the stream stored in the track is the 3DoF region of the texture layer, but the file generating unit 105 may define a new field and store similar information in the field.

3.2 Modified Example (2) of Third Embodiment

Furthermore, an encoding unit 103 performs encoding by using multi-layer HEVC in the third embodiment and the modified example (1) thereof, but it is also possible to encode the texture layer and the depth layer by using HEVC/advanced video coding (AVC). The same applies to the second embodiment and the modified example thereof. In this case, the "3DoF+" metadata for each stream is represented as timed metadata, stored in an individual track, and associated with a track that stores a texture layer and a depth layer by using the track reference.

The file generating unit 105 extends an ISOBMFF/elementary stream (SEI) and stores the identification information of the texture layer and the depth layer, and association information of the layer pair constituting the atlas. As a result, the information stored by oinf/oref/sbas in L-HEVC storage can be applied to HEVC/AVC. The file generating unit 105 can store other information even in a case of HEVC/AVC as in L-HEVC storage.

As described above, as HEVC/AVC is used, it is possible to use a decoder generally distributed in the market. Furthermore, even a client device that does not support the decoding of the "3DoF+" stream can decode and render the texture layer track.

4. Fourth Embodiment

In each of the embodiments and the modified examples thereof described above, the ISOBMFF is used as a format in which the bitstream is stored, but other formats can also be used.

Figure 25:
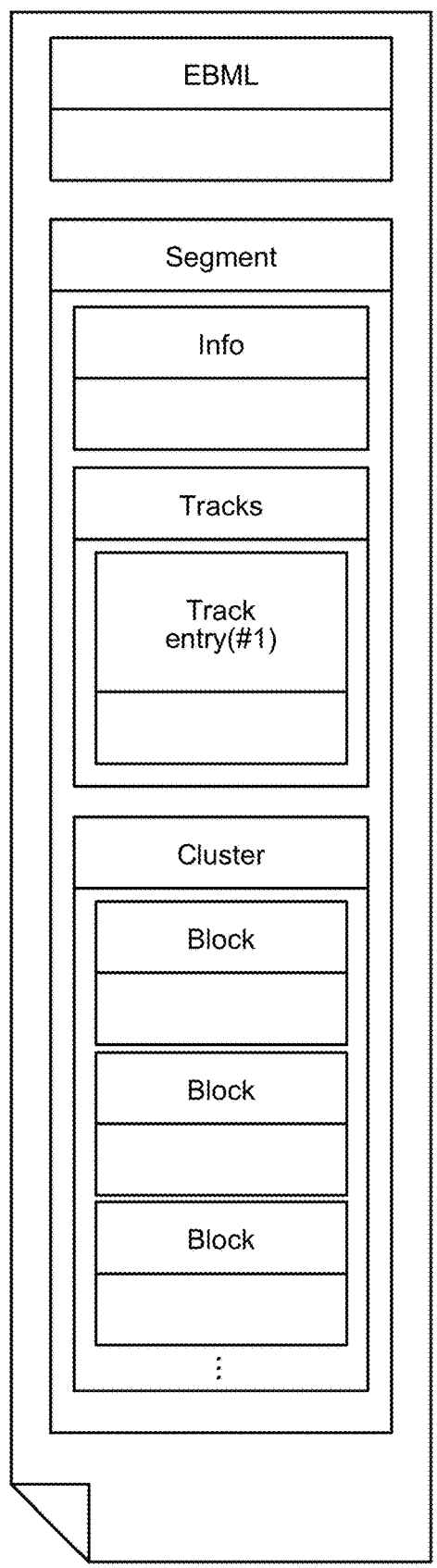
FIG. 25 is a diagram illustrating a format of Matroska Media Container.

For example, the file generating unit 105 can also use the Matroska Media Container having a format illustrated in FIG. 25. FIG. 25 is a diagram illustrating the format of the Matroska Media Container. In this case, the file generating unit 105 stores the identification information of the texture layer and the depth layer and the information associating the atlas ID with the layer pair as a newly defined element under a Trak Entry element. Further, the file generating unit 105 also stores the post decoding information stored in ProjectionInfoBox( ) in the ISOBMFF file as a newly defined element under the Trak Entry element.

As described above, it is possible to generate a segment file even when a format other than the ISOBMFF is used, and even in this case, it is possible to obtain the same effects as those of each embodiment and each modified example thereof.

Although the embodiments of the present disclosure have been described above, the technical scope of the present disclosure is not limited to the above-described embodiments, and various modifications can be made without departing from the scope of the present disclosure. Moreover, components of different embodiments and modified examples may be appropriately combined.

Note that the effects described in the present specification are merely examples. The effects of the present disclosure are not limited thereto, and other effects may be obtained.

Note that the present technology can also have the following configurations.

(1)
An information processing apparatus comprising:
an atlas processing unit that generates atlas identification information associating a texture image that forms a reference two-dimensional image corresponding to each projection direction formed by projecting three-dimensional data from a predetermined viewpoint position in a plurality of projection directions and a complementary image for generating, from the reference two-dimensional image, a moved two-dimensional image based on a viewpoint position moved within a limited range from the predetermined viewpoint position, with a depth image corresponding to the texture image, and each piece of post decoding information for rendering each reference two-dimensional image and each moved two-dimensional image, the post decoding information including first post decoding information indicating that the first post decoding information is information of a "3DoF+" region in which the complementary image in the texture image is stored;
an encoding unit that encodes the texture image and the depth image to generate a texture layer and a depth layer; and
a file generating unit that generates a file including the texture layer, the depth layer, the atlas identification information, and the post decoding information.

(2)
The information processing apparatus according to (1), wherein the file generating unit stores the atlas identification information in sgpd'oinf' of Moov in an ISOBMFF file.

(3)
The information processing apparatus according to (1) or (2), wherein the file generating unit allocates a track of an ISOBMFF file to the texture layer and the depth layer, and stores the first post decoding information in a first box in the track allocated to the texture layer and the depth layer.

(4)
The information processing apparatus according to (3), wherein the atlas processing unit causes the post decoding information to include second post decoding information including information of a 3DoF region in which the reference two-dimensional image in the texture image is stored.

(5)
The information processing apparatus according to (4), wherein the atlas processing unit causes the second post decoding information to include information indicating that it is the information of the 3DoF region.

(6)
The information processing apparatus according to (3), wherein the file generating unit stores the second post decoding information in a second box different from the first box in the track to which the first box is allocated in the ISOBMFF file.

(7)
The information processing apparatus according to (1) or (2), wherein the file generating unit allocates the texture layer and the depth layer to different tracks of an ISOBMFF file, respectively, and the respective tracks are associated by using a Track reference.

(8)
The information processing apparatus according to (7), wherein the atlas processing unit causes the post decoding information to include first identification information indicating whether or not information of a 3DoF region in which the reference two-dimensional image in the texture image is stored is included in a target of the rendering.

(9)

The information processing apparatus according to (8), wherein the file generating unit stores the first identification information in Scheme Type Box in the track to which the texture layer is allocated.

(10)

The information processing apparatus according to (7), wherein the atlas processing unit causes the post decoding information to include second identification information indicating whether or not the information of the "3DoF+" region is included in a target of the rendering.

(11)

The information processing apparatus according to (10), wherein the file generating unit stores the second identification information in Compatible Scheme Type Box in the track to which the texture layer is allocated.

(12)

The information processing apparatus according to (1) or (2), wherein the file generating unit allocates different tracks in an ISOBMFF file to a 3DoF region in which the reference two-dimensional image in the texture image is stored, the "3DoF+" region, a first region of the depth image that corresponds to the 3DoF region, and a second region of the depth image that corresponds to the "3DoF+" region, respectively, and associates a track storing "3DoF+" metadata with each of the tracks to which the 3DoF region and the "3DoF+" region are allocated and each of the tracks to which the first region and the second region are allocated, by using a Track reference.

(13)

The information processing apparatus according to (12), wherein the atlas processing unit causes the post decoding information to include first identification information indicating that a target of the rendering is information of the 3DoF region.

(14)

The information processing apparatus according to (13), wherein the file generating unit stores information regarding the 3DoF region in the atlas identification information in Moov Box in a track allocated to the 3DoF region of the texture layer.

(15)

The information processing apparatus according to (13), wherein the file generating unit stores the first identification information in SchemeTypeBox in a track to which the texture layer is allocated.

(16)

The information processing apparatus according to (12), wherein the atlas processing unit causes the post decoding information to include second identification information indicating that a target of the rendering is the information of the "3DoF+" region.

(17)

The information processing apparatus according to (16), wherein the file generating unit stores information regarding the "3DoF+" region in the atlas identification information in Moov Box in a track allocated to the "3DoF+" region of the texture layer.

(18)

The information processing apparatus according to (16), wherein the file generating unit stores the second identification information in SchemeTypeBox in a track to which the texture layer is allocated.

(19)

An information processing method causing a computer to perform processing of:

generating atlas identification information indicating association of a texture image for a reference two-dimensional image corresponding to a projection direction in a case where three-dimensional data is projected from a predetermined viewpoint position in a plurality of projection directions and a correction image for generating, from the reference two-dimensional image, a moved two-dimensional image based on a viewpoint position moved from the predetermined viewpoint position, with a depth image, and post decoding information for rendering the reference two-dimensional image and the moved two-dimensional image, the post decoding information including first post decoding information which is information of a "3DoF+" region in which the correction image in the texture image is stored;

encoding the texture image and the depth image to generate a texture layer and a depth layer; and generating a file including the texture layer, the depth layer, the atlas identification information, and the post decoding information in the texture image.

(20)

A reproduction processing device comprising:

a file acquisition unit that acquires a file including atlas identification information indicating association of a texture image for a reference two-dimensional image corresponding to a projection direction in a case where three-dimensional data is projected from a predetermined viewpoint position in a plurality of projection directions and a correction image for generating, from the reference two-dimensional image, a moved two-dimensional image based on a viewpoint position moved from the predetermined viewpoint position, with a depth image, post decoding information for rendering the reference two-dimensional image and the moved two-dimensional image, the post decoding information including first post decoding information which is information of a "3DoF+" region in which the correction image in the texture image is stored, a texture layer obtained by encoding the texture image, and a depth layer obtained by encoding the depth image;

a file processing unit that acquires the atlas identification information and the post decoding information from the file, and determines an image generation method according to a processing capability of the reproduction processing device based on the acquired atlas identification information and post decoding information;

a decoding processing unit that decodes both of the texture layer and the depth layer or the texture layer according to the image generation method determined by the file processing unit to generate both of the texture image and the depth image or the texture image; and a display information generating unit that generates a display image according to the image generation method based on the image generated by the decoding processing unit.

(21)

A reproduction processing method causing a computer to perform processing of:

acquiring a file including atlas identification information indicating association of a texture image for a reference two-dimensional image corresponding to a projection direction in a case where three-dimensional data is projected from a predetermined viewpoint position in a plurality of projection directions and a correction image for generating, from the reference two-dimensional image, a moved two-dimensional image based on a viewpoint position moved from the predetermined viewpoint position, with a depth image, post decoding information for rendering the reference two-dimensional image and the moved two-dimensional image, the post decoding information including first post decoding information which is information of a "3DoF+" region in which the correction image in the texture image is stored, a texture layer obtained by encoding the texture image, and a depth layer obtained by encoding the depth image;

acquiring the atlas identification information and the post decoding information from the file, and determines an image generation method according to a processing capability of a reproduction processing device based on the acquired atlas identification information and post decoding information;

decoding both of the texture layer and the depth layer or the texture layer according to the determined image generation method to generate both of the texture image and the depth image or the texture image; and generating a display image according to the image generation method based on the generated image.

REFERENCE SIGNS LIST

1 FILE GENERATION DEVICE
2 CLIENT DEVICE
3 Web SERVER
4 NETWORK
10 GENERATION PROCESSING UNIT
11 CONTROL UNIT
20 REPRODUCTION PROCESSING UNIT
21 CONTROL UNIT
101 DATA INPUT UNIT
102 ATLAS PROCESSING UNIT
103 ENCODING UNIT
104 BITSTREAM GENERATING UNIT
105 FILE GENERATING UNIT
106 TRANSMISSION UNIT
201 FILE ACQUISITION UNIT
202 FILE PROCESSING UNIT
203 DECODING PROCESSING UNIT
204 DISPLAY INFORMATION GENERATING UNIT
205 DISPLAY UNIT
220 EXTRACTION UNIT
230 DECODER
241 ATLAS DECOMPOSITION UNIT
242 DISPLAY PROCESSING UNIT

The invention claimed is:

1. An information processing apparatus comprising:
a memory; and
a processor configured to:
generate atlas identification information indicating an association of a texture image with a depth image corresponding to the texture image, the texture image comprising:
  a reference two-dimensional image corresponding to a predetermined projection direction formed by projecting three-dimensional data from a predetermined viewpoint position, the predetermined projection direction being one of a plurality of projection directions,
  a plurality of complementary images for generating, from the reference two-dimensional image, a plurality of moved two-dimensional images, each of the plurality of moved two-dimensional images corresponding to one of the plurality of viewpoint positions that are moved within a predetermined range from the predetermined viewpoint position, and
wherein the reference two-dimensional image and the plurality of moved two-dimensional images are associated with corresponding pieces of a plurality of pieces of post decoding information, the plurality of pieces of post decoding information being information for rendering the reference two-dimensional image and the plurality of moved two-dimensional images,
wherein the plurality of pieces of post decoding information includes first post decoding information indicating that the first post decoding information is information indicating a 3 degrees of freedom plus (3DoF+) region in the texture image in which the plurality of complementary images is stored;
encode the texture image and the depth image so as to generate an encoded texture layer and an encoded depth layer; and
generate a file that includes the encoded texture layer, the encoded depth layer, the atlas identification information, and the plurality of pieces of post decoding information.

2. The information processing apparatus according to claim 1, wherein the memory stores the atlas identification information in a SampleGroupDescriptionBox operating points info property (sgpd'oinf') of a movie box (MOOV Box) in an International Organization for Standardization (ISO) base media file format (ISOBMFF) file.

3. The information processing apparatus according to claim 1, wherein the processor allocates a track of an International Organization for Standardization (ISO) base media file format (ISOBMFF) file to the encoded texture layer and the encoded depth layer, and stores the first post decoding information in a first box in the track allocated to the encoded texture layer and the encoded depth layer.

4. The information processing apparatus according to claim 3, wherein the processor causes the plurality of pieces of post decoding information to include second post decoding information that includes information indicating a 3 degrees of freedom (3DoF) region in the texture image in which the reference two-dimensional image is stored.

5. The information processing apparatus according to claim 4, wherein the processor causes the second post decoding information to include information indicating that it is the information indicating the 3DoF region.

6. The information processing apparatus according to claim 5, wherein the memory stores the second post decoding information in a second box different from the first box in the track to which the first box is allocated in the ISOBMFF file.

7. The information processing apparatus according to claim 1, wherein the processor allocates the encoded texture layer and the encoded depth layer to different tracks of an International Organization for Standardization (ISO) base media file format (ISOBMFF) file, respectively, and the respective tracks are identified by using a Track reference identifier.

8. The information processing apparatus according to claim 7, wherein the processor causes the plurality of pieces of post decoding information to include first identification information indicating whether or not information of indicating a 3 degrees of freedom (3DoF) region in the texture image in which the reference two-dimensional image is stored is included in a target of the rendering of the reference two-dimensional image and the plurality of moved two-dimensional images.

9. The information processing apparatus according to claim 8, wherein the memory stores the first identification information in a Scheme Type Box in the track to which the encoded texture layer is allocated.

10. The information processing apparatus according to claim 7, wherein the processor causes the plurality of pieces of post decoding information to include second identification information indicating whether or not the information indicating the "3DoF+" region is included in a target of the rendering of the reference two-dimensional image and the plurality of moved two-dimensional images.

11. The information processing apparatus according to claim 10, wherein the processor stores the second identification information in a Compatible Scheme Type Box in the track to which the encoded texture layer is allocated.

12. The information processing apparatus according to claim 1, wherein the processor allocates different tracks in an International Organization for Standardization (ISO) base media file format (ISOBMFF) file to:
   a 3 degrees of freedom (3DoF) region in the texture image in which the reference two-dimensional image is stored,
   the "3DoF+" region,
   a first region of the depth image that corresponds to the 3DoF region, and
   a second region of the depth image that corresponds to the "3DoF+" region, respectively, and
   wherein the processor associates a track storing "3DoF+" metadata with;
   each of the tracks to which the 3DoF region and the "3DoF+" region are allocated, and
   each of the tracks to which the first region and the second region are allocated, by using a Track reference identifier.

13. The information processing apparatus according to claim 12, wherein the processors causes the plurality of pieces of post decoding information to include first identification information indicating that a target of the rendering of the reference two-dimensional image and the plurality of moved two-dimensional images is information indicating the 3DoF region.

14. The information processing apparatus according to claim 13, wherein the memory stores information regarding the 3DoF region in the atlas identification information in a movie box (MOOV Box) in a track allocated to the 3DoF region of the texture layer.

15. The information processing apparatus according to claim 13, wherein the memory stores the first identification information in a SchemeTypeBox in a track to which the encoded texture layer is allocated.

16. The information processing apparatus according to claim 12, wherein the processor causes the plurality of pieces of post decoding information to include second identification information indicating that a target of the rendering of the reference two-dimensional image and the plurality of moved two-dimensional images is the information indicating the "3DoF+" region.

17. The information processing apparatus according to claim 16, wherein the memory stores information regarding the "3DoF+" region in the atlas identification information in a movie box (MOOV Box) in a track allocated to the "3DoF+" region of the texture layer.

18. The information processing apparatus according to claim 16, wherein the memory stores the second identification information in SchemeTypeBox in a track to which the encoded texture layer is allocated.

19. An information processing method causing a computer to perform processing of:
   generating atlas identification information indicating an association of a texture image with a depth image corresponding to the texture image, the texture image comprising:
      a reference two-dimensional image corresponding to a predetermined projection direction formed by projecting three-dimensional data from a predetermined viewpoint position, the predetermined projection direction being one of a plurality of projection directions, and
      a plurality of complementary images for generating, from the reference two-dimensional image, a plurality of moved two-dimensional images, each of the plurality of moved two-dimensional images corresponding to one of the plurality of viewpoint positions that are moved within a predetermined range from the predetermined viewpoint position,
   wherein the reference two-dimensional image and the plurality of moved two-dimensional images are associated with corresponding pieces of a plurality of pieces of post decoding information, the plurality of pieces of post decoding information being information for rendering the reference two-dimensional image and the plurality of moved two-dimensional images, and
   wherein the plurality of pieces of post decoding information includes first post decoding information indicating that the first post decoding information is information indicating a 3 degrees of freedom plus (3DoF+) region in the texture image in which the plurality of complementary images is stored;
   encoding the texture image and the depth image so as to generate an encoded texture layer and an encoded depth layer; and
   generating a file that includes the encoded texture layer, the encoded depth layer, the atlas identification information, and the plurality of first post decoding information.

20. A reproduction processing device comprising:
   a memory; and
   a processor configured to:
   acquire a file that includes atlas identification information indicating an association of a texture image with a depth image corresponding to the texture image, the texture image comprising:
      a reference two-dimensional image corresponding to a predetermined projection direction formed by projecting three-dimensional data from a predetermined viewpoint position, the predetermined projection direction being one of a plurality of projection directions, and
      a plurality of complementary images for generating, from the reference two-dimensional image, a plurality of moved two-dimensional images, each of the plurality of moved two-dimensional images corresponding to one of the plurality of viewpoint positions that are moved within a predetermined range from the predetermined viewpoint position,
   wherein the reference two-dimensional image and the plurality of moved two-dimensional images are associated with corresponding pieces of a plurality of pieces of post decoding information, the plurality of pieces of post decoding information being information for rendering the reference two-dimensional image and the plurality of moved two-dimensional images, and wherein the plurality of pieces of post decoding information includes first post decoding information indicating that the first post decoding information is information indicating a 3 degrees of freedom plus (3DoF+) region in the texture image in which the plurality of complementary images is stored;

acquire the atlas identification information and the plurality of pieces of post decoding information from the file, and determines an image generation method according to a processing capability of the reproduction processing device based on the acquired atlas identification information and the plurality of pieces of post decoding information;

decode both of the encoded texture layer and the encoded depth layer according to the image generation method determined by the processor and that generates both of the texture image and the depth image from the decoded texture layer and the decoded depth layer; and generate a display image according to the image generation method based on the texture image and the depth image generated by the processor.

21. A reproduction processing method causing a computer to perform processing of:

acquiring a file that includes atlas identification information indicating an association of a texture image with a depth image corresponding to the texture image, the texture image comprising:

a reference two-dimensional image corresponding to a predetermined projection direction formed by projecting three-dimensional data from a predetermined viewpoint position, the predetermined projection direction being one of a plurality of projection directions, and a plurality of complementary images for generating, from the reference two-dimensional image, a plurality of moved two-dimensional images, each of the plurality of moved two-dimensional images corresponding to one of the plurality of viewpoint positions that are moved within a predetermined range from the predetermined viewpoint position, wherein the reference two-dimensional image and the plurality of moved two-dimensional images are associated with corresponding pieces of a plurality of pieces of post decoding information, the plurality of pieces of post decoding information being information for rendering the reference two-dimensional image and the plurality of moved two-dimensional images, and wherein the plurality of pieces of post decoding information includes first post decoding information indicating that the first post decoding information is information indicating a 3 degrees of freedom plus (3DoF+) region in the texture image in which the plurality of complementary images is stored:

acquiring the atlas identification information and the plurality of pieces of post decoding information from the file, and determining an image generation method according to a processing capability of a reproduction processing device based on the acquired atlas identification information and the plurality of pieces of post decoding information;

decoding both of the encoded texture layer and the encoded depth layer according to the determined image generation method and generating both of the texture image and the depth image from the decoded texture layer and the decoded depth layer; and generating a display image according to the image generation method based on the generated texture image and the depth image.

* * * * *